(12) United States Patent
Nagata et al.

(10) Patent No.: US 10,288,451 B2
(45) Date of Patent: *May 14, 2019

(54) ROTATION ANGLE SENSING DEVICE

(71) Applicant: TDK Corporation, Tokyo (JP)

(72) Inventors: Masaki Nagata, Tokyo (JP); Kazuya Watanabe, Tokyo (JP)

(73) Assignee: TDK Corporation, Tokyo (JP)

(\*) Notice: Subject to any disclaimer, the term of this patent is extended or adjusted under 35 U.S.C. 154(b) by 99 days.

This patent is subject to a terminal disclaimer.

(21) Appl. No.: 15/409,678

(22) Filed: Jan. 19, 2017

(65) Prior Publication Data

US 2017/0261347 A1    Sep. 14, 2017

(30) Foreign Application Priority Data

Mar. 11, 2016  (JP) .................................. 2016-48623

(51) Int. Cl.
  *G01D 5/14*     (2006.01)
  *G01D 5/165*    (2006.01)
(52) U.S. Cl.
  CPC ............. *G01D 5/165* (2013.01); *G01D 5/145* (2013.01)
(58) Field of Classification Search
  CPC ............................... G01D 5/165; G01D 5/145
  See application file for complete search history.

(56) References Cited

U.S. PATENT DOCUMENTS

| 2003/0052669 A1* | 3/2003 | Enomoto | G01D 5/145 324/207.25 |
| 2011/0080163 A1* | 4/2011 | Hariu | G01B 7/30 324/207.25 |

FOREIGN PATENT DOCUMENTS

| JP | 2003-075108 A | 3/2003 |
| JP | 2006-047227 A | 2/2006 |

\* cited by examiner

*Primary Examiner* — Arleen M Vazquez
*Assistant Examiner* — Feba Pothen
(74) *Attorney, Agent, or Firm* — Posz Law Group, PLC

(57) ABSTRACT

A rotation angle sensing device is provided with a magnet that has a component with a magnetization vector in a direction orthogonal to a rotary shaft, a magnetic sensor part that outputs a sensor signal, and a rotation angle sensing part that detects a rotation angle of a rotating body based upon the sensor signal; the magnet has first and second surfaces substantially orthogonal to the rotary shaft, and a concave side surface that is continuous throughout all circumferences in the circumferential direction; the magnetic sensor part is placed within the space surrounded by the concave side surface, and at a position where an amplitude of a magnetic field intensity $H_r$ and an amplitude of a magnetic field intensity $H_\theta$ on the virtual plane are substantially identical to each other, and outputs either the magnetic field intensity $H_r$ or the magnetic field intensity $H_\theta$ as the sensor signal.

14 Claims, 19 Drawing Sheets

ROTATION ANGLE SENSING DEVICE

CROSS REFERENCE TO RELATED APPLICATIONS

The present application is based on Japanese Patent Application No. 2016-48623 filed on Mar. 11, 2016, the disclosure of which is incorporated herein by reference.

TECHNICAL FIELD

The present invention relates to a rotation angle sensing device for detecting a rotation angle of a rotating body.

BACKGROUND TECHNOLOGY

Conventionally, a rotation angle sensing device for detecting a rotation angle of a rotating body has been used for various purposes. One such known rotation angle sensing device is provided with a magnet that is fixed so as to rotate integrally with a rotating body, and a magnetic sensor element for detecting a change in intensity of a magnetic field in association with rotation of the magnet. In such a rotation angle sensing device, the magnetic sensor element outputs a signal indicating a relative positional relationship between the rotating body and the magnetic sensor element.

A known conventional rotation angle sensing device, as shown in FIG. 31, includes a magnet 200 that is formed like a disk and is supported by and fixed to a shaft S (rotary shaft) so as to allow a first surface 201 and a second surface 202 of the magnet 200 to be orthogonal to the shaft S (rotary shaft), and a magnetic sensor element (Hall element) 300 that is arranged immediately beneath an outer circumference of the second surface 202 of the magnet 200, and it a circumferential direction centering on the shaft S (rotary shaft) (see Patent Literature 1).

In the rotation angle sensing device, because shaft wobble occurs and causes the shaft S (rotary shaft) to minutely move, the magnet 200 supported by and fixed to the shaft S (rotary shaft) minutely moves in the radial direction. In the meantime, the magnetic sensor element (Hall element) 300 is arranged to as to measure magnetic flux density in a direction that is parallel with the shaft S (rotary shaft) at a corner portion(s) of the outer circumference of the magnetic 200. Consequently, a measured value for magnetic flux density that is measured by the magnetic sensor element (Hall element) 300 varies greatly in association with the minute movement of the magnet 200, and an error in measurement of a rotation angle is accentuated.

Conventionally, as shown in FIG. 32, a rotation angle sensing device is proposed that is provided with two magnets 210 that are supported by and fixed to the shaft S (rotary shaft) across a void in the axial direction of the shaft S, and two magnetic sensor elements (Hall elements) 310 that are arranged between rotary shaft directions of the two magnets 210, and between an outer circumferential end of the shaft S and that of the magnets 210 (see Patent Literature 2).

PRIOR ART LITERATURE

Patent Literature

[Patent Literature 1] Japanese Patent Application Laid-Open No. 2003-75108
[Patent Literature 2] Japanese Patent Application Laid-Open No. 2006-47227

SUMMARY OF THE INVENTION

Problem to be Solved by the Invention

In the rotation angle sensing device described in Patent Literature 2 above, since a closed magnetic field where lines of magnetic flux are oriented to be aligned in the radial direction is formed in the space interposed by the two magnets 210 (the space between the outer circumferential end of the shaft S and outer circumferential ends of the magnets 210), a detection error of the rotation angle is not accentuated, even by minute movement of the magnets 210, because of the arrangement of two magnetic sensor elements 310 in the space where the closed magnetic field is formed.

However, in the rotation angle sensing device described in Patent Literature 2 above, since only magnetic flux of the magnets 210 in the radial direction is detected by the two magnetic sensor elements (Hall elements) 310, the detection accuracy of the rotation angle is insufficient. Further, if the positions (positions in the radial direction of the magnets 210) in which to place the two magnetic sensor elements (Hall elements) 310 mutually shift, intensity of the magnetic flux that is detected by each magnetic sensor element (Hall element) 310 in association with the rotation of the magnets 210 varies, and as a result, a detection error of the rotation angle becomes accentuated.

In view of the problems above, the present invention provides a rotation angle sensing device enabling accurate detection of a rotation angle based upon magnetic field intensity in a radial direction and/or a circumferential direction.

Means for Solving the Problem

In order to solve the above problems, the present invention provides a rotation angle sensing device that is provided with a magnet that is integrally rotatable with a rotary shaft of a rotating body in association with the rotation of the rotating body, and that has a component with a magnetization vector in a direction orthogonal to the rotary shaft, a magnetic sensor part that outputs a sensor signal based upon a change of a magnetic field in association with the rotation of the magnet, and a rotation angle sensing part that detects a rotation angle of the rotating body based upon the sensor signal output by the magnetic sensor part, wherein the magnet has a first surface substantially orthogonal to the rotary shaft and a second surface facing the first surface, and a concave side surface that is continuous throughout all circumferences in the circumferential direction; when a virtual plane that is orthogonal to the rotary shaft, and that is circularly centered upon the rotary shaft, is set within a space surrounded by the concave side surface, the magnetic sensor part is placed within the space surrounded by the concave side surface, and at a position where an amplitude of a magnetic field intensity $H_r$ in a radial direction and an amplitude of a magnetic field intensity $H_\theta$ in a circumferential direction on the virtual plane are substantially identical to each other, and outputs either the magnetic field intensity $H_r$ in the radial direction or the magnetic field intensity $H_\theta$ in the circumferential direction as the sensor signal (Invention 1).

In the invention above (Invention 1), on a cross sectional surface of the magnet along the axial direction of the rotary shaft, it is preferable that the concave side surface is substantially U-shaped, substantially V-shaped or substantially angularly U-shaped outwardly in the radial direction of the magnet (Invention 2).

In the invention above (Invention 2), on a cross sectional surface of the magnet along the axial direction of the rotary shaft, when a point, which is situated on the concave side surface positioned at one side in the axial direction of the rotary shaft and is situated at the farthest position from the rotary shaft, is considered as a first point, another point, which is situated on the concave side surface positioned at the other side in the axial direction of the rotary shaft and is situated at the farthest position from the rotary shaft, is considered as a second point, and another point, which is situated at the nearest position to the rotary shaft on the concave side surface, is considered as a third point, it is preferable that an angle between a first line connecting the first point and the third point and a second line connecting the second pont and the third point is 40° to 90° (Invention 3).

In the invention above (Invention 1), it is preferable that the magnet has a plane-symmetrical shape where a plane that is orthogonal to the rotary shaft passing through a center point of the magnet in the axial direction of the rotary shaft is considered as a symmetric surface (Invention 4), and it is further preferble that the magnetic sensor part is placed on the symmetric surface (Invention 5).

Further, the present invention provides a rotation angle sensing device that is provided with: a first magnet and a second magnet that are placed to be integrally rotatable with a rotary shaft of a rotating body in association of rotation of the rotary body, and that has a magnetization vector orthogonal to the rotary shaft, respectively, a magnetic sensor part that outputs a sensor signal based upon a change of a magnetic field in association with the rotation of the first magnet and the second magnet, and a rotation angle sensing part that detects an rotation angle of the rotating body based upon the sensor signal output by the magntic sensor, wherein the first magnet and the second magnet have a first surface that is substantially orthogonal to the rotary shaft, respectively, and are placed so that first surfaces opposed one another at predetermined intervals; when a third virtual plane, which is orthogonal to the rotary shaft and is circularly centered upon the rotary shaft, is set within a space interposed by a first virtual plane including the first surface of the first magnet and a second virtual plane including the first surface of the second magnet, the magnetic sensor part is placed within the space and at a position where amplitude of a magnetic field intensity $H_r$ in a radial direction and a magnetic field intensity $H_\theta$ in a circumferential direction on the third virtual plane are substantially identical to each other, and outputs either the magnetic field intensity $H_r$ in the radial direction or the magnetic field intensity $H_\theta$ in the circumferential direction as the sensor signal (Invention 6).

In the invention above (Invention 6), it is preferable that the magnetic sensor part is placed substantially at the center in the axial direction of the rotary shaft between the first virtual plane and the second virtual plane (Invention 7).

In the invention (Invention 6), it is preferable that the magnetic sensor part is placed at a position farther from the rotary shaft than the outer edge part of the first surfaces of the first magnet and the second magnet (Invention 8).

In the invention (Invention 6), it is preferable that the first magnet and the second magnet have a plane-symmetrical shape where a plane that is orthogonal to the rotary shaft passing a center point between their first surfaces in the axial direction of the rotary shaft (Invention 9).

In the invention (Invention 6), it is preferable that when a plane that is orthogonal to the rotary shaft is set and a magnetization direction of the first magnet and that of the second magnet are indicated with a first arrow and a second arrow, respectively, and the first arrow and the second arrow are projected onto the plane, a direction of a first projected arrow where the first arrow is projected on the plane and a direction of a second projected arrow where the second arrow is projected are different from each other (Invention 10), and it is preferable that an angle between a first segment along the first projected arrow and a second segment along the second projected arrow is $(180/(N+1))°$ or $180×N/(N+1))°$ (N is an integer greater than or equal to 1) (Invention 11).

In the invention above (Invention 1), the magnetic sensor part that includes a TMR element, a GMR element or an AMR element (Invention 12) can be used.

In the invention above (Invention 1), it is preferable that the rotation angle sensing device has a plurality of the magnetic sensor parts and at least two of the plurality of magnetic sensor parts are arranged substantially at intervals of $(180/M)°$ (M is an integer greater than or equal to 2) centering on the rotary shaft along the circumferential direction on an orthogonal plane that is orthogonal to the rotary shaft (Invention 13), and it is preferable that each of the magnetic sensor parts outputs the magnetic field intensity $H_r$ in the radial direction or the magnetic field intensity $H_\theta$ in the circumferential direction as the sensor signal (Invention 14).

Effect of the Invention

According to the present invention, a rotation angle sensing device can be provided that enables accurate detection of a rotation angle based upon magnetic field intensity in a radial direction and/or a circumferential direction.

MODE FOR CARRYING OUT THE INVENTION

First Embodiment

Figure 1:
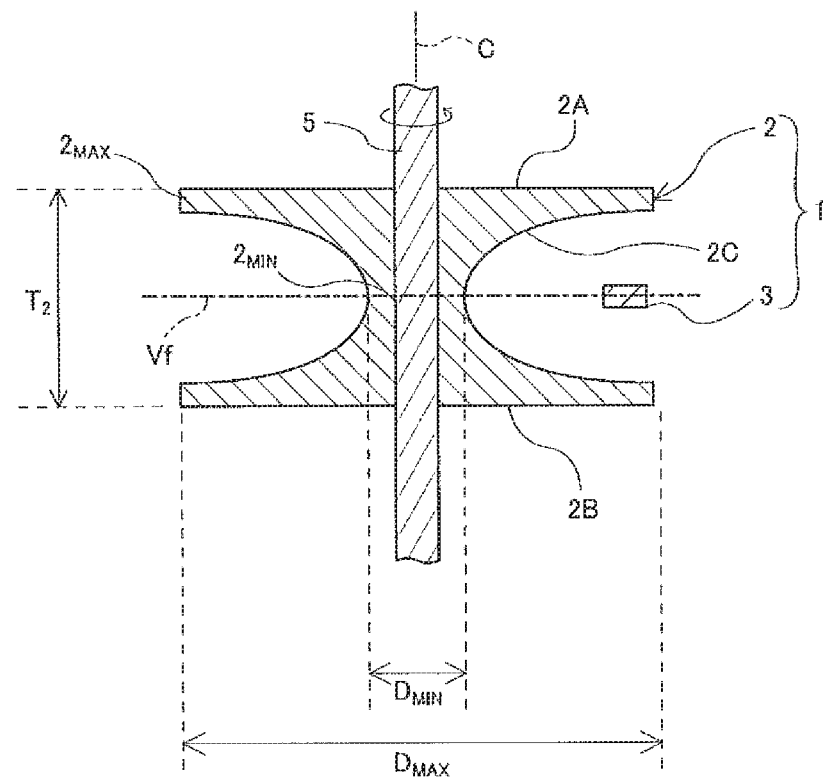
FIG. 1 is a cross-sectional view showing a schematic configuration of the rotation angle sensing device relating to the first embodiment of the present invention.
Figure 2A:
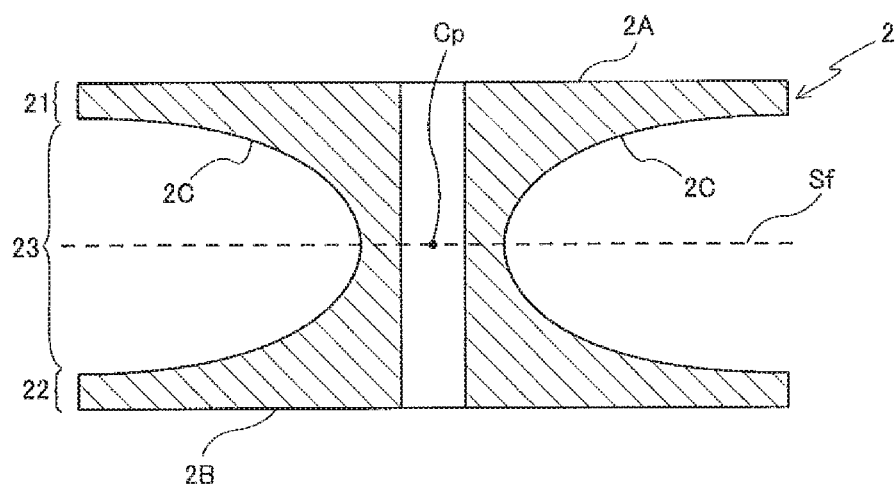
FIGS. 2A to 2C are cross-sectional views showing a schematic configuration of a magnet in the first embodiment of the present invention.
Figure 2B:
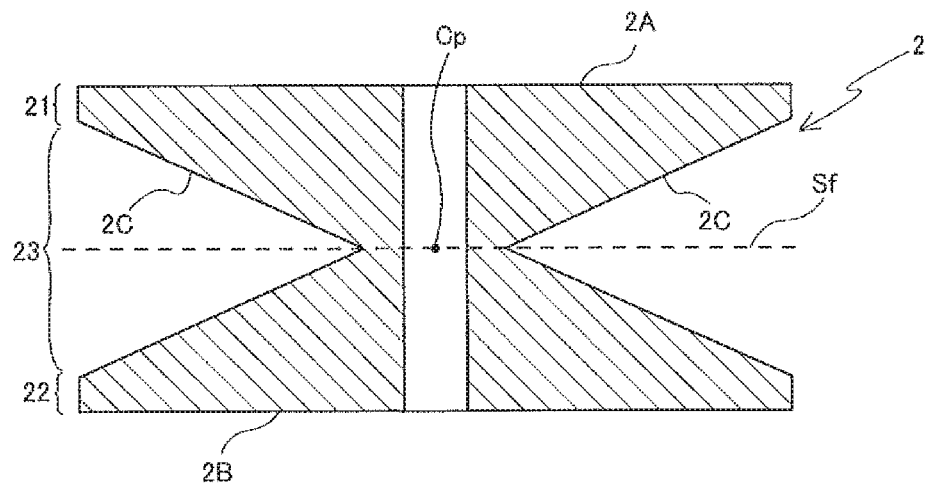

The first embodiment of the present invention is explained in detail with reference to the drawings. FIG. 1 is a cross-sectional view showing a schematic configuration of a rotation angle sensing device relating to the first embodiment, and FIGS. 2A to 2C is a cross-sectional view showing a schematic configuration of a magnet in the first embodiment, respectively.

As shown in FIG. 1, a rotation angle sensing device 1 relating to the first embodiment is provided with a magnet 2 that is supported by and fixed to a shaft 5, and that integrally rotates with the shaft 5; a magnetic sensor part 3 that outputs a sensor signal based upon a change in a direction of a magnetic field in association with the rotation of the magnet 2; and a rotation angle sensing part 4 (see FIG. 15) that detects a rotation angle of a rotating body based upon the sensor signal output from the magnetic sensor part 3.

The magnet 2 includes a first surface 2A that is substantially orthogonal to a rotary shaft C (shaft center) of the shaft 5, a second surface 2B opposing the first surface 2A, and concave side surface 2C that continue throughout the entire circumference in the circumferential direction, and is supported by and fixed to the shaft 5 so as to match centroids (centers) of the first surface 2A and the second surface 2B of the magnet 2 with the rotary shaft C of the shaft 5. Furthermore, the magnet 2 is magnetized in a direction that is orthogonal to the rotary shaft C of the shaft 5 (in-plane direction of the first surface 2A and the second surface 2B). In the first embodiment, the magnet 2 that is magnetized in the direction that is orthogonal to the rotary shaft C is exemplified, but is not limited to such a mode. For example, the magnet 2 should have a magnetization vector component in the direction that is orthogonal to the rotary shaft C, but it is preferable that a magnetization direction of the magnet 2 is substantially orthogonal to the rotary shaft C (an angle of the magnetization direction to the rotary shaft C is approximately 90±10°).

Figure 2C:
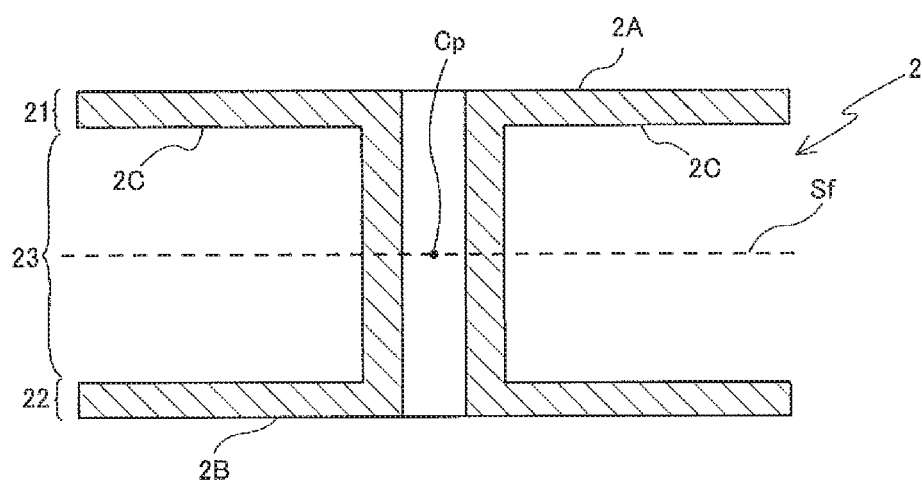

In the first embodiment, although the shape of the concave side surface 2C in the magnet 2 is substantially U-shaped so that it opens outwardly in the radial direction of the magnet 2 on the cross section when the magnet 2 is dissected on the plane including the rotary shaft C of the shaft 5 (see FIG. 1 and FIG. 2A), the shape shall not be limited to such a mode, and, for example, it can be substantially V-shaped (see FIG. 2B) or substantially angularly U-shaped (see FIG. 2C). If the shape is substantially U-shaped, substantially V-shaped, or substantially angularly U-shaped, as described below, when a circular virtual plane Vf that is orthogonal to the rotary shaft C within the space surrounded by the concave side surface 2C, and that centers on the rotary shaft C is set, a region where amplitudes of magnetic field intensity $H_r$ in a radial direction and magnetic field intensity $H_\theta$ in a circumferential direction are substantially identical to each other at a predetermined position on the virtual plane Vf is formed. The virtual plane Vf is a plane that is optionally set so as to pass through the space surrounded by the concave side surface 2C of the magnet 2.

A thickness $T_2$ of the magnet 2 is not particularly limited, but can be set, for example, to approximately 5 mm to 15 mm. If the thickness $T_2$ of the magnet 2 is less than 5 mm, the amplitudes of the magnetic field intensity $H_r$ in the radial direction and the magnetic field intensity $H_\theta$ in the circumferential direction become smaller at a predetermined position on the circular virtual plane Vf, and the detection sensitivity of the angle of rotation may be decreased, and if it exceeds 15 mm, it may become difficult to reduce the manufacturing cost of the rotation angle sensing device 1.

As shown in FIGS. 2A to 2C, the magnet 2 in the first embodiment is configured with a first large-diameter part 21 including the first surface 2A, a second large-diameter 22 including the second surface 2B, and a small-diameter part 23 that includes the concave side surface 2C and a minimum-diameter part $2_{MIN}$ (a portion nearest to the shaft 5 on the concave side surface 2C), and that is positioned between the first large-diameter part 21 and the second large-diameter part 22.

Figure 3A:
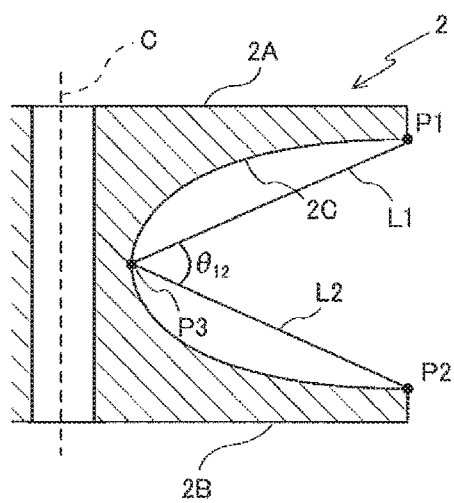
FIGS. 3A to 3C are cross-sectional views showing a schematic configuration of a concave side surface of the magnet in the first embodiment of the present invention.
Figure 3B:
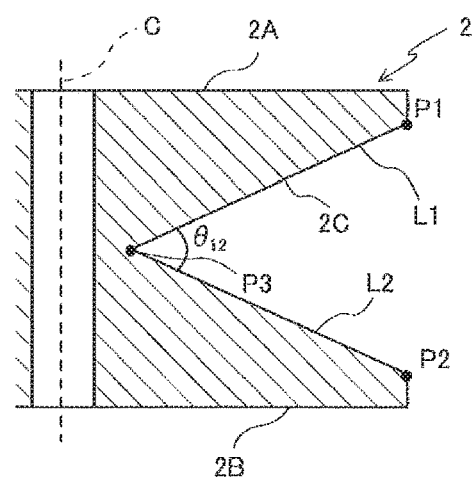
Figure 3C:
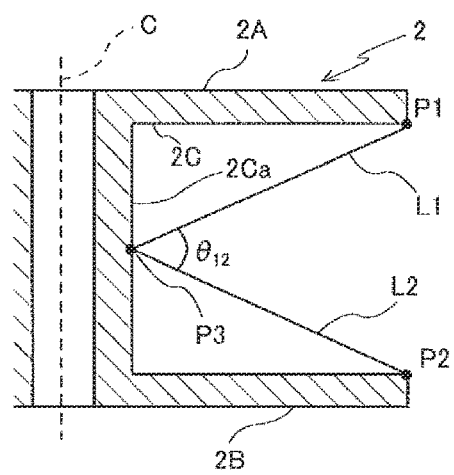
Figure 4:
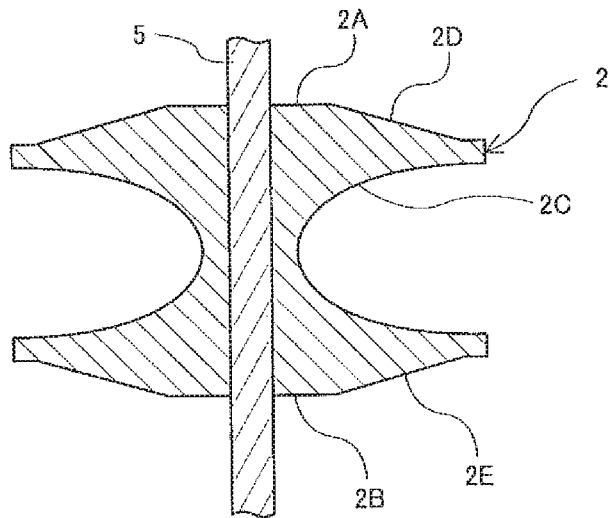
FIG. 4 is a cross-sectional view showing another mode (Part 1) of the magnet in the first embodiment of the present invention.
Figure 5:
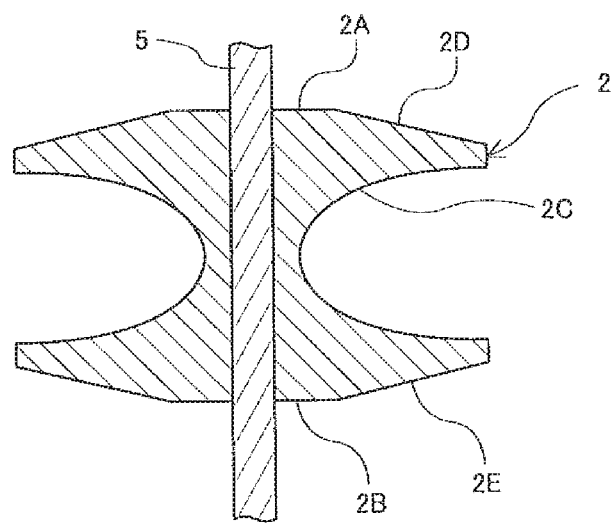
FIG. 5 is a cross-sectional view showing another mode (Part 2) of the magnet in the first embodiment of the present invention.

As shown in FIG. 3A to FIG. 3C, on the cross section at the time of dissecting the magnet 2 on the plane including the rotary shaft C, a point, which is on the concave side surface 2C positioned at one side of the rotary shaft C in the axial direction (at the side of first surface 2A of the magnet 2, at the upper side in FIG. 3A to FIG. 3C), and which is a point positioned farthest from the rotary shaft C, is considered as a first point P1, and another point, which is a point on the concave side surface 2C positioned at the other side of the rotary shaft C in the axial direction (at the side of the second surface 2B of the magnet 2, at the lower side in FIG. 3A to FIG. 3C), and which is a point positioned farthest from the rotary shaft C, is considered as a second point P2. Then, another point positioned closest to the rotary shaft C on the concave side surface 2C is considered as a third point P3. Furthermore, if the concave side surface 2C of the magnet 2 is substantially angularly U-shaped (see FIG. 3C), the third point P3 is a point positioned in the center of the rotary shaft C in the axial direction, situated on a side surface 2Ca, which is substantially parallel to the rotary shaft C within the concave side surface 2C.

At this time, it is preferable that an angle $\theta_{12}$ formed between a first line L1 connecting the first point P1 and the third point P3, and a second line connecting the second point P2 and the third point P3 is 40° to 90°. If the angle $\theta_{12}$ is less than 40°, a difference occurs between the amplitude of the magnetic field intensity $H_r$ in the radial direction and that of the magnetic field intensity $H_\theta$ in the circumferential direction within the space surrounded by the concave side surface 2C, and a detection error in the rotation angle may become accentuated. If the angle $\theta_{12}$ exceeds 90°, the magnetic field intensity $H_r$ in the radial direction attributable to a magnetic body in the vicinity of the concave side surface 2C becomes accentuated, and a difference may occur between the amplitude of the magnetic field intensity $H_r$ in the radial direction and the amplitude of the magnetic field intensity $H_\theta$ in the circumferential direction. Further, volume of the magnet 2 happens to be greater, and it may cause an increase in the manufacturing cost. In the meantime, if the angle $\theta_{12}$ is within the range above, the amplitude of the magnetic field intensity $H_r$ in the radial direction and that of the magnetic field intensity $H_\theta$ in the circumferential direction at a predetermined position on the circular virtual plane Vf can be substantially identical to each other. Furthermore, a diameter $D_{MIN}$ in the minimum-diameter part $2_{MIN}$ can be set, for example, to approximately 10 mm to 20 mm, and a diameter $D_{MAX}$ in the maximum-diameter part $2_{MAX}$ can be set, for example, to approximately 10 mm to 50 mm.

As shown in FIGS. 2A to 2C, the magnet 2 in the first embodiment has a plane-symmetrical shape considering a surface Sf that is orthogonal to the rotary shaft C passing through a center point (a midpoint between the first surface 2A and the second surface 2B of the rotary shaft C of the shaft 5 in the axial direction) Cp of the magnet 2 in the axial direction of the rotary shaft C of the shaft 5, as a symmetric surface. Because the magnet 2 has such a plane-symmetrical shape, a region where the amplitude of the magnetic field intensity $H_r$ in the radial direction and that of the magnetic field intensity $H_\theta$ in the circumferential direction at the predetermined position on the circular virtual plane Vf are substantially identical to each other can be formed within the space surrounded by the concave side surface 2C with a substantially U-shaped, substantially V-shaped, or substantially angularly U-shaped cross section.

Figure 6:
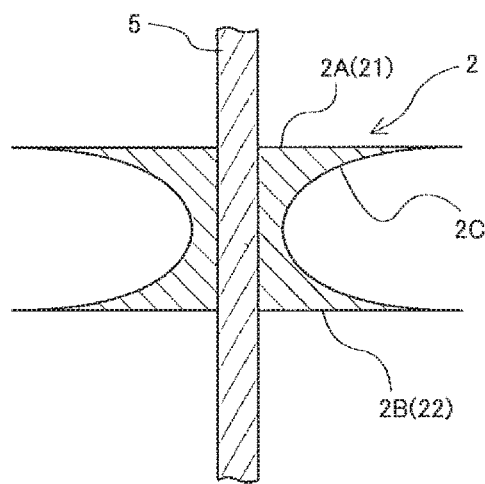
FIG. 6 is a cross-sectional view showing another mode (Part 3) of the magnet in the first embodiment of the present invention.
Figure 7:
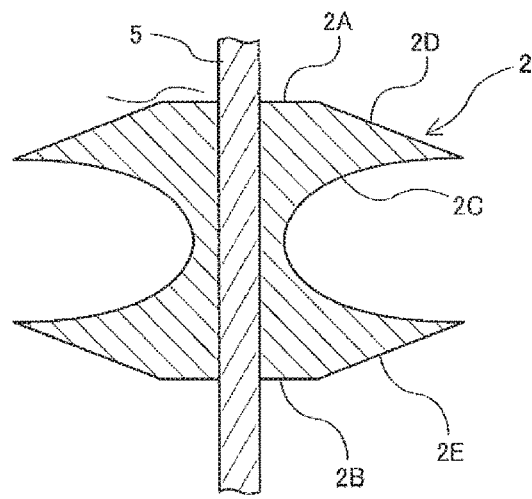
FIG. 7 is a cross-sectional view showing another mode (Part 4) of the magnet in the first embodiment of the present invention.
Figure 8:
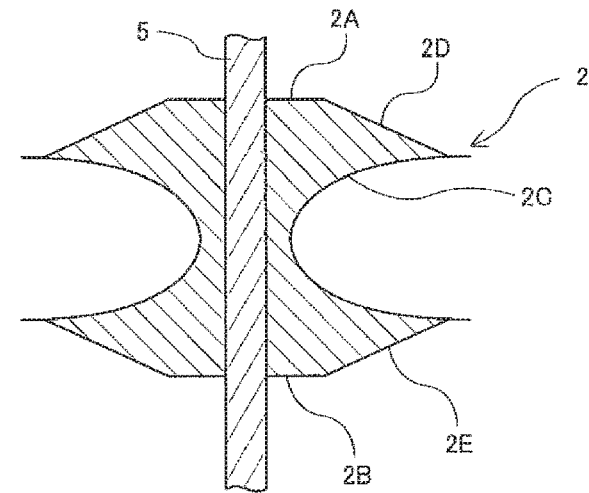
FIG. 8 is a cross-sectional view showing another mode (Part 5) of the magnet in the first embodiment of the present invention.

Furthermore, the magnet in the first embodiment shall not be limited to the modes shown in FIG. 1 and FIGS. 2A to 2C. For example, it can be structured such that the large-diameter part 21 and the large-diameter part 22 protrude toward the side of the first surface 2A and the side of the second surface 2B from the position that is more inside in the radial direction of the magnet 2 than the most outer edge portion of the magnet 2 or from the most outer edge portion, respectively, while tilting via tilted surfaces 2D and 2E (see FIGS. 4 to 5 and FIGS. 7 to 8). Further, the large-diameter part 21 and the large-diameter part 22 may be structured so as to not have a substantial thickness (see FIG. 6).

Figure 9A:
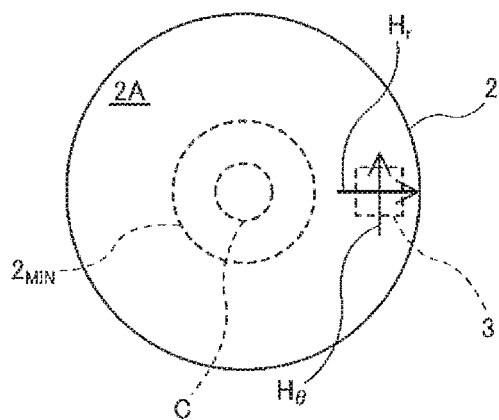
FIG. 9A is a schematic view showing magnetic field intensity (magnetic field intensity in a radial direction and a circumferential direction) detected by a magnetic sensor part in the first embodiment of the present invention.
Figure 9B:
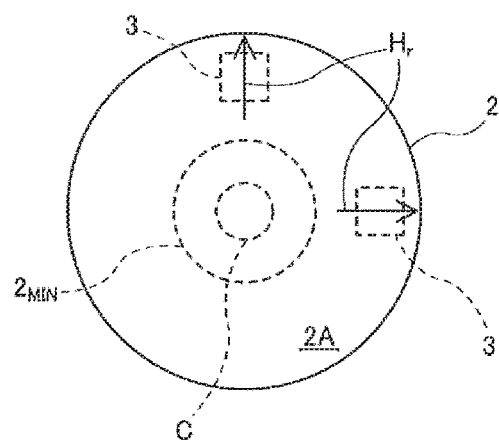
FIG. 9B is a schematic view showing another mode of magnetic field intensity (magnetic field intensity in a radial direction) detected by the magnetic sensor.
Figure 9C:
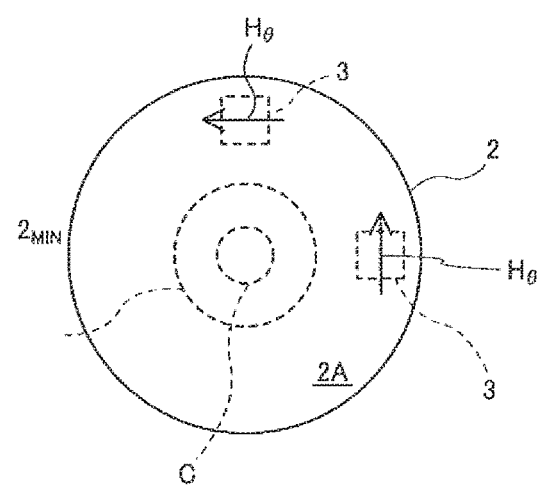
FIG. 9C is a schematic view showing another mode of magnetic field intensity (magnetic field intensity in a circumferential direction) detected by the magnetic sensor.

The magnetic sensor part 3 in the first embodiment is placed at a position where amplitude of the magnetic field intensity $H_r$ in the radial direction and that of the magnetic field intensity $H_\theta$ in the circumferential direction at a predetermined position on the circular virtual plane Vf are substantially identical to each other. Furthermore, in the present embodiment, as shown in FIG. 9A, a mode where one magnetic sensor part 3 that can detect the magnetic field intensity $H_r$ in the radial direction and the magnetic field intensity $H_\theta$ in the circumferential direction is exemplified, but the embodiment shall not be limited to this mode. For example, as shown in FIG. 9B and FIG. 9C, the two magnetic sensor parts 3 that are arranged at intervals of 90° centering on the rotary shaft C of the shaft 5 may be placed. In this case, the two magnetic sensor parts 3 may detect the magnetic field intensity $H_r$ in the radial direction, respectively (see FIG. 9B), or may detect the magnetic field intensity $H_\theta$ in the circumferential direction, respectively (see FIG. 9C). Further, in the case of placing a plurality of magnetic sensor parts 3, at least two out of the plurality of magnetic sensor parts 3 should be placed substantially at intervals of (180/M) degrees (M is an integer greater than or equal to 2, and preferably an integer of 2 to 5) centering upon the rotary shaft C of the shaft 5. An M-order high-frequency error component is contained in a signal output from the magnet sensor part 3, but since the M-order high-frequency error component can be removed by placing the magnetic sensor parts 3 at intervals of (180/M) degrees centering on the rotary shaft C, a detection error of the rotation angle can be further reduced.

Figure 10:
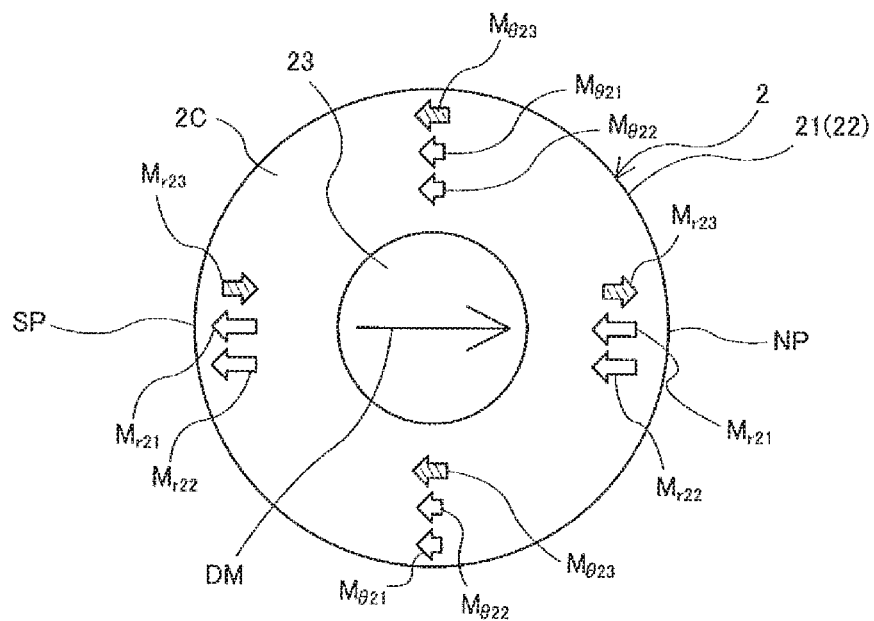
FIG. 10 conceptually shows magnetic field intensity in a radial direction and a circumferential direction within a space surrounded by the concave side surface of the magnet in the first embodiment of the present invention.

In the first embodiment, within the space surrounded by the concave side surface 2C of the magnet 2, the magnetic field intensity $H_r$ in the radial direction on the circular virtual plane Vf can be treated as a sum of a magnetic field $M_{r21}$ in the radial direction to be generated by the first large-diameter part 21 including the first surface 2A of the magnet 2, a magnetic field $M_{r22}$ in the radial direction to be generated by the second large-diameter part 22 including the second surface 2B, and a magnetic field $M_{r23}$ in the radial direction to be generated by the small-diameter part 23 including the minimum-diameter $2_{MIN}$. Further, the magnetic field intensity $H_\theta$ in the circumferential direction can be treated as a sum of a magnetic field $M_{\theta21}$ in the radial direction to be generated by the first large-diameter part 21, a magnetic field $M_{\theta22}$ in the radial direction to be generated by the second large-diameter part 22 and a magnetic field $M_{\theta23}$ in the radial direction to be generated by the small-diameter part 23 (see FIG. 10).

In the case of magnetization in the in-plane direction of the magnet 2 as in the first embodiment, the strength of the magnetic field intensity $H_r$ in the radial direction on the circular virtual plane Vf becomes maximum in the vicinity of an N-pole side edge part NP and an S-pole side edge part SP, respectively, and becomes minimum at positions rotated by 90 degrees from the N-pole side edge part NP and the S-pole side edge part SP centering upon the shaft 5, respectively. In the meantime, strength of the magnetic field intensity $H_\theta$ in the circumference direction becomes maximum at positions rotated by 90 degrees from the N-pole side edge part NP and the S-pole side edge part SP centering upon the shaft 5, respectively, and becomes minimum in the vicinity of the N-pole side edge part NP and the S-pole side edge part SP centering upon the shaft 5, respectively. In the first embodiment, directions of the magnetic fields $M_{r21}$ and $M_{r22}$ in the radial direction generated by the first large-diameter part 21 and the second large-diameter part 22 at the N-pole side edge part NP and the S-pole side edge part SP, respectively, are antiparallel to a magnetization direction DM of the magnet 2, but the direction of the magnetic field $M_{r23}$ in the radial direction generated by the small diameter part 23 is parallel to the magnetization direction DM of the magnet 2. Then, the strength of the magnetic field $M_{r23}$ (magnetic field intensity $H_{r23}$) in the radial direction generated by the small-diameter part 23 is smaller than those of the magnetic fields $M_{r21}$ and $M_{r22}$ (magnetic field intensities $H_{r21}$ and $H_{r22}$) generated by the first large-diameter part 21 and the second large-diameter part 22 ($H_{r23}$<$H_{r21}$, $H_{r22}$). Furthermore, in FIG. 10, the strengths of the magnetic fields $M_{r21}$, $M_{r22}$, $M_{r23}$, $M_{\theta21}$, $M_{\theta22}$ and $M_{\theta23}$ (magnetic field intensities $H_{r21}$, $H_{r22}$, $H_{r23}$, $H_{\theta21}$, $H_{\theta22}$ and $H_{\theta23}$) are indicated with the lengths of arrows, respectively.

In the meantime, the directions of the magnetic fields $M_{\theta21}$ and $M_{\theta22}$ in the circumferential direction generated by the first large-diameter part 21 and the second large-diameter part 22 at positions rotated by 90 degrees from the N-pole side edge part NP and the S-pole side edge part SP centering on the shaft 5, and the direction of the magnetic field $M_{\theta23}$ in the circumferential direction generated by the small-diameter part 23 are both antiparallel with the magnetization direction DM of the magnet 2, and the strengths of the magnetic fields $M_{\theta21}$, $M_{\theta22}$ and $M_{\theta23}$ (magnetic field intensities $H_{\theta21}$, $H_{\theta22}$ and $H_{\theta23}$) are smaller than strengths of the magnetic fields $M_{r21}$, $M_{r22}$ and $M_{r23}$ in the radial direction (magnetic field intensities $H_{r21}$, $H_{r22}$ and $H_{r23}$) generated by the first large-diameter part 21, the second large-diameter part 22 and the small-diameter part 23 at the N-pole side edge part NP and the S-pole side edge part SP ($H_{r21}$>$H_{\theta21}$, $H_{r22}$>$H_{\theta22}$, $H_{r23}$>$H_{\theta23}$). Consequently, the amplitude of the magnetic field intensity $H_r$ in the radial direction and that of the magnetic field intensity $H_\theta$ in the circumferential direction are substantially identical.

Figure 11A:
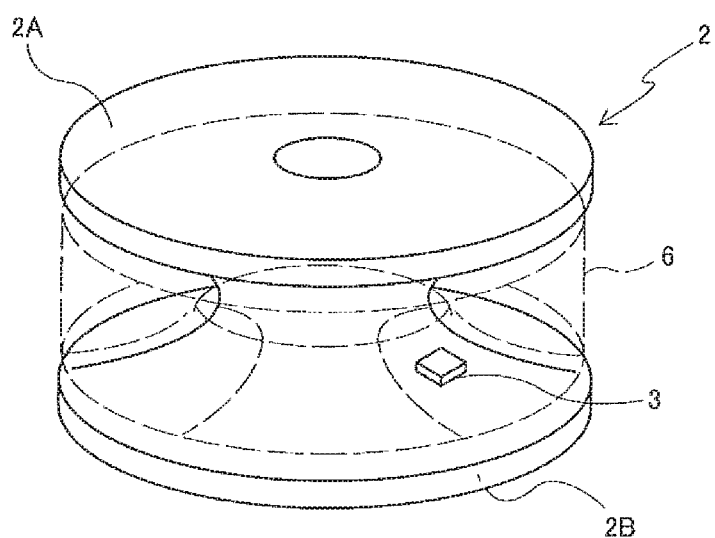
FIG. 11A is a perspective view schematically showing the magnet and a magnetic sensor arrangeable region in the first embodiment of the present invention.
Figure 11B:
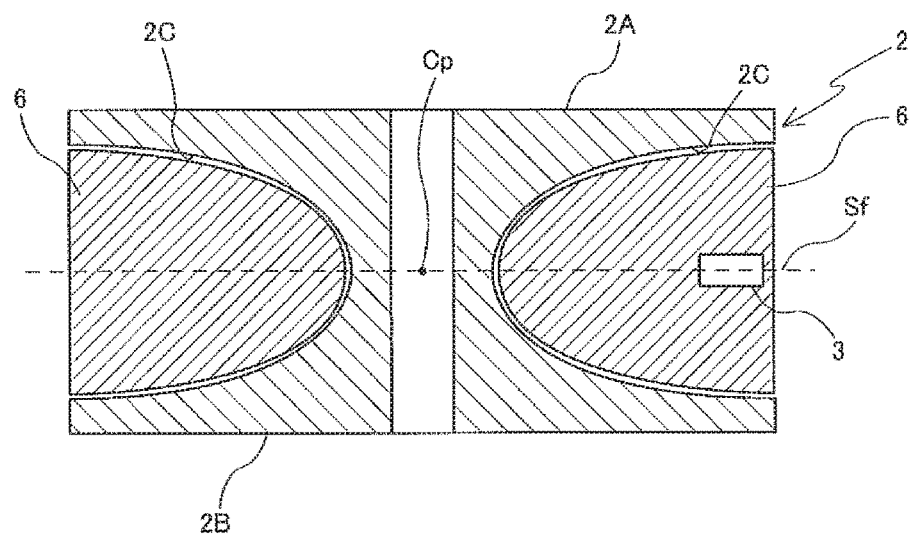
FIG. 11B is a cross-sectional view of FIG. 11A.
Figure 12:
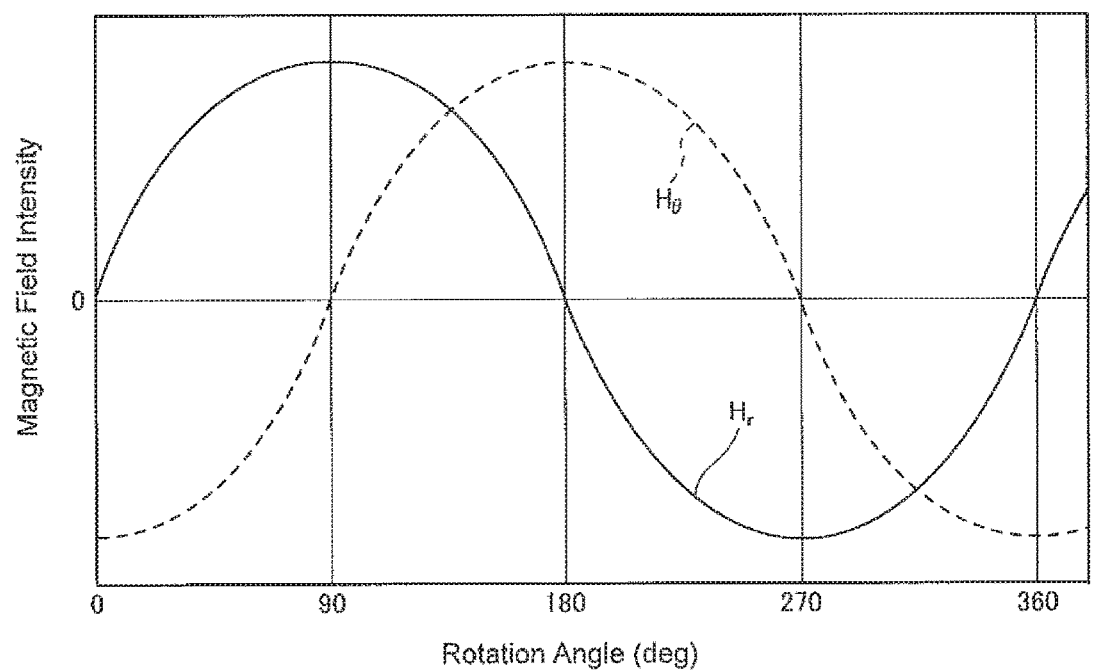
FIG. 12 is a graph showing amplitude of the magnetic field intensity detected in the rotation angle sensing device relating to the first and second embodiments of the present invention.

As described above, in the space surrounded by the concave side surface 2C in the first embodiment, a region where the amplitude of the magnetic field intensity $H_r$ and that of the magnetic field intensity $H_\theta$ in the radial direction and the circumferential direction become substantially identical to each other at the predetermined position on the circular virtual plane Vf (magnetic sensor arrangeable region 6) is generated (see FIG. 11A and FIG. 11B). In particular, on the surface Sf (symmetric surface) orthogonal to the rotary shaft C of the shaft 5 passing through the center point Cp of the magnet 2, the amplitude of the magnetic field intensity $H_r$ in the radial direction and that of the magnetic field intensity $H_\theta$ in the circumferential direction further coincide. Therefore, since the amplitude of the magnetic field intensity $H_r$ in the radial direction and that of the magnetic field intensity $H_\theta$ in the circumferential direction at the predetermined position on the circular virtual plane Vf can be substantially identical by placing the magnetic sensor part 3 in this magnetic sensor arrangeable region 6 (see FIG. 12), a detection error of the rotation angle by the rotation angle sensing device 1 relating to the first embodiment can be reduced.

The magnetic sensor part 3 in the first embodiment includes at least one magnetic detecting element. The magnetic sensor part 3 may include a pair of magnetic detecting elements connected in series as at least one magnetic detecting element. In this case, the magnetic sensor part 3 has first and second detection circuits including a pair of first magnetic detecting elements connected in series and a pair of second magnetic detecting elements connected in series.

Figure 13A:
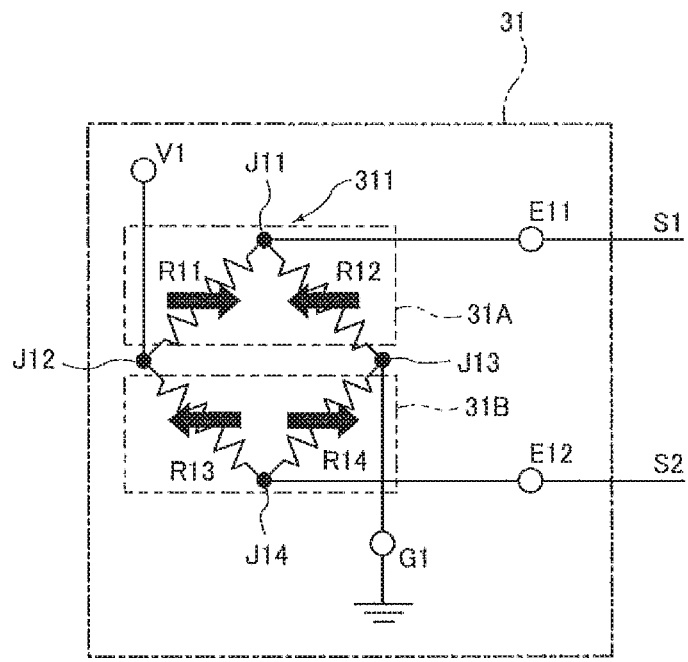
FIG. 13A and FIG. 13B are circuit diagrams schematically showing one mode of a circuit configuration of a magnetic sensor part in the first and second embodiments of the present invention.

As shown in FIG. 13A, the first detecting circuit 31 in the magnetic sensor part 3 includes a power-supply port V1, a ground port G1, two output ports E11 and E12 and a first Wheatstone bridge circuit 311. The first Wheatstone bridge circuit 311 has a first signal generator part 31A including a pair of first magnetic detecting elements R11 and R12 connected in series, and a second signal generator part 31B including a pair of second magnetic detecting elements R13 and R14 connected in series. A connecting point J12 of the magnetic detecting elements R11 and R13 is connected to the power-supply port V1. A connecting point J11 of the magnetic detecting elements R11 and R12 is connected to the output port E11. A connecting point J14 of the magnetic detecting elements R13 and R14 is connected to the output port E12. A connecting point J13 of the magnetic detecting elements R12 and R14 is connected to the ground port G1. A power-supply voltage with a predetermined magnitude is applied to the power-supply port V1, and ground port G1 is connected to ground. A first signal S1 generated by a first signal generator part 31A is output from the output port E11, and a second signal S2 generated by a second signal generator 31B is output from the output port E12.

Figure 13B:
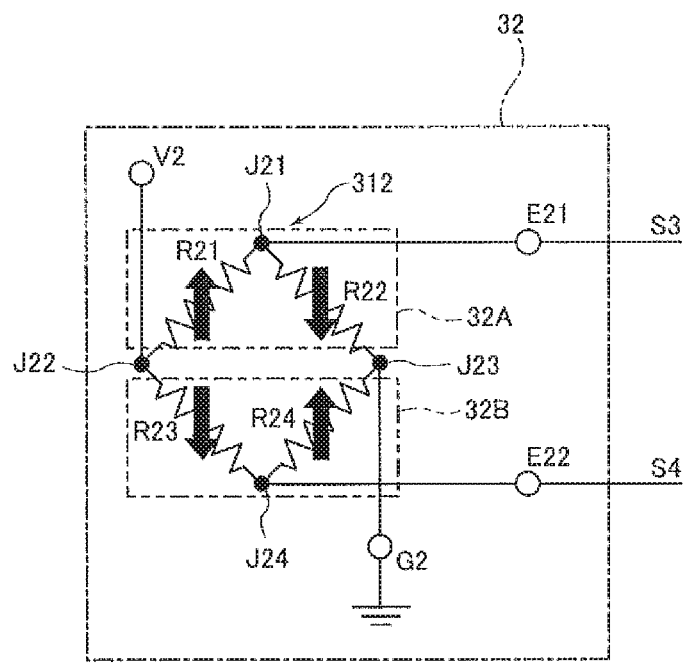

Further, as shown in FIG. 13B, the second detection circuit 32 in the magnetic sensor part 3 has a power-supply port V2, a ground port G2, two output ports E21 and E22, and a second Wheatstone bridge circuit 312. The second Wheatstone bridge circuit 312 has a third signal generator part 32A including a pair of third magnetic detecting elements R21 and R22 connected in series, and a fourth signal generator part 32B including a pair of fourth magnetic detecting elements R23 and R24 connected in series. A connecting point J22 of the magnetic detecting elements R21 and R23 is connected to the power-supply port V2. A connecting point J21 of the magnetic detecting elements R21 and R22 is connected to the output port E21. A connecting point J24 of the magnetic detecting elements R23 and R24 is connected to the output port E22. A connecting point J23 of the magnetic detecting elements R22 and R24 is connected to the ground port G2. A power-supply voltage with a predetermined intensity is applied to the power-supply port V2, and the ground port G2 is connected to ground. A third signal S3 generated by a third signal generator part 32A is output from the output port E21, and a fourth signal S4 generated by a fourth signal generator part 32B is output from the output port E22.

In the first embodiment, for all magnetic detecting elements R11 to R14 and R21 to R24 contained in the first and second detection circuits 31 and 32, a magnetoresistive effect element (MR element), such as a TMR element, a GMR element or an AMR element, can be used, and it is particularly preferable to use a TMR element. The TMR element and the GMR element have a magnetization pinned layer having a magnetization direction that is pinned, a free layer having a magnetization direction that varies according to a direction of a magnetic field to be applied, and a nonmagnetic layer that is arranged between the magnetization pinned layer and the free layer.

Figure 14:
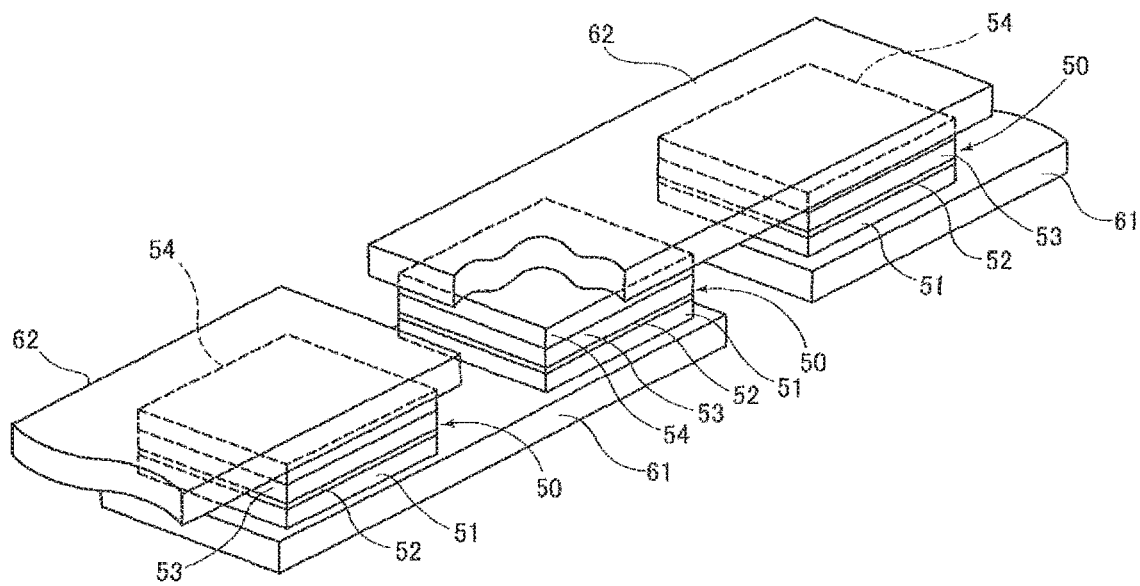
FIG. 14 is a perspective view showing a schematic configuration of an MR element as a magnetic detecting element in the first and second embodiments of the present invention.

Specifically, as shown in FIG. 14, the TMR element and the GMR element have a plurality of lower-side electrodes 61, a plurality of MR films 50 and a plurality of upper-side electrodes 62, respectively. The plurality of lower-side electrodes 61 are placed on a substrate (not shown). Each lower-side electrode 61 has a long and narrow shape. A crevice is formed between two adjacent lower-side electrodes 61 in the longitudinal direction of the lower-side electrodes 61. The MR films 50 are placed in the vicinity of both ends in the longitudinal direction on the upper surface of the lower-side electrode 61, respectively. The MR films 50 include a free layer 51, a nonmagnetic layer 52, a magnetization pinned layer 53 and an antiferromagnetic layer 54 laminated in order from the lower-side electrode 61 side. The free layer 51 is electrically connected to the lower-side electrode 61. The antiferromagnetic layer 54 is configured with an antiferromagnetic material, and functions to pin the magnetization direction of the magnetization pinned layer 53 by generating exchange-coupling with the magnetization pinned layer 53. The plurality of upper-side electrodes 62 are placed on the plurality of MR films 50. Each upper-side electrode 52 has a long and narrow shape and is arranged on the two lower-side electrodes 61 adjacent in the longitudinal direction of the lower-side electrode 61, and electrically connects the antiferromagnetic layers 54 of the two adjacent MR films 50 with each other. Furthermore, the MR films 50 may have a configuration where the free layer 51, the nonmagnetic layer 52, the magnetization pinned layer 53 and the antiferromagnetic layer 54 are laminated in order from the upper-side electrode 62 side.

In the TMR element, a nonmagnetic layer 52 is a tunnel bather layer. In the GMR element, a nonmagnetic layer 52 is a nonmagnetic conductive layer. In the TMR element and the GMR element, a resistance value varies according to an angle of the magnetization direction of the free layer 51 with regard to that of the magnetization pinned layer 53, and the resistance value becomes minimum when this angle is 0° (magnetization directions are in parallel with each other), and the resistance value becomes maximum when the angle is 180° (magnetization directions are antiparallel with each other).

In FIG. 13A, the magnetization directions of the magnetization pinned layers in the magnetic detecting elements R11 to R14 are indicated with solid arrows, respectively. In the first detection circuit 31, the magnetization direction of the magnetization pinned layer 53 in the magnetic detecting elements R11 and R14 and that of the magnetization pinned layer 53 in the magnetic detecting elements R12 and R13 are antiparallel with each other, and are orthogonal to a radial direction of the magnet 2.

In the first signal generator part 31A, if the magnetic field intensity $H_r$ in the radial direction is changed due to rotation of the magnet 2, the magnetization directions of the free layers 51 in the magnetic detecting elements R11 and R12 are changed accordingly, and electric potential of the connecting point J11 is changed based upon a relative angle between the magnetization direction of the free layer 41 and that of the magnetization pinned layer 53. Further, even in the second signal generator part 31B, similarly, the electric potential of the connecting point J14 is changed based upon a relative angle between the magnetization direction of the free layer 51 and that of the magnetization pinned layer 53 in the magnetic elements R13 and R14. Therefore, the first signal generator part 31A generates the first signal S1 corresponding to the magnetic field intensity $H_r$ in the radial direction, and the first signal S1 is output from the output port E11. The second signal generator part 31B generates the second signal S2 corresponding to the magnetic field intensity $H_r$ in the radial direction, and the second signal S2 is output from the output port E12.

Similarly, in FIG. 13B, the magnetization directions of the magnetization pinned layers in the magnetic detecting elements R21 to R24 are indicated with solid arrows, respectively. In the second detection circuit 32, the magnetization directions of the magnetization pinned layers 53 in the magnetic detecting elements R21 and R24 and those of the magnetization pinned layers 53 in the magnetic detecting elements R22 and R23 are antiparallel with each other, and are parallel to the magnetization direction DM of the magnet 2, respectively.

In the third signal generator part 32A, if the magnetic field intensity $H_\theta$ in the circumferential direction is changed due to the rotation of the magnet 2, the magnetization directions of the free layers 41 in the magnetic detecting elements R21 and R22 are changed accordingly, and the electric potential of the connecting point J21 is changed based upon a relative angle between the magnetization directions of the free layers 51 and those of the magnetization pinned layers 53. Further, even in the fourth signal generator part 32B, similarly, the electric potential of the connecting point J24 is changed based upon a relative angle between the magnetization directions of the free layers 51 and those of the magnetization direction in the magnetization pinned layer 53 in the magnetic detecting elements R23 and R24, respectively. Therefore, the third signal generator part 32A generates a third signal S3 corresponding to the magnetic field intensity $H_\theta$ of the magnet 2 in the circumferential direction, and the third signal S3 is output from the output port E21. The fourth signal generator part 32B generates a fourth signal S4 corresponding to the magnetic field intensity Ho of the magnet 2 in the circumferential direction, and the fourth signal S4 is output from the output port E22.

Figure 15:
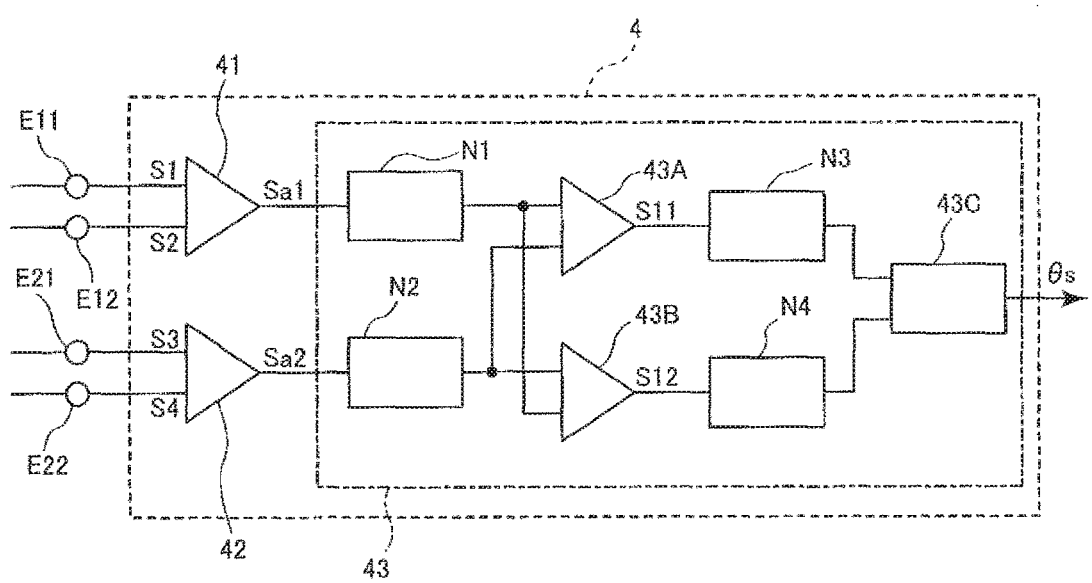
FIG. 15 is a circuit diagram schematically showing one mode of the circuit configuration of a rotation angle sensing part in the first and second embodiments of the present invention.

The rotation angle sensing part 4 in the first embodiment has a first arithmetic circuit 41, a second arithmetic circuit 42 and a third arithmetic circuit 43 as shown in FIG. 15, and generates a rotation angle detection value Os based upon the first to fourth signals S1 to S4.

The output ports E11 and E12 are connected to two input ends of the first arithmetic circuit 41, respectively. The output ports E21 and E22 are connected to two input ends of the second arithmetic circuit 42, respectively. The output ports of the first and second arithmetic circuits 41 and 42 are connected to two input ends of the third arithmetic circuit 43, respectively.

The first arithmetic circuit 41 generates a first post-arithmetic signal Sa1 based upon the first and second signals S1 and S2. The second arithmetic circuit 42 generates a second post-arithmetic signal Sa2 based upon the third and fourth signals S3 and S4. The third arithmetic circuit 43 generates a rotation angle detection value θs based upon the first and second post-arithmetic signals Sa1 and Sa2.

The first post-arithmetic signal Sa1 is generated by an operation for obtaining a difference (S1−S2) between the first signal S1 and the second signal S2. The second post-arithmetic signal Sa2 is generated by an operation for obtaining a difference (S3−S4) between the third signal S3 and the fourth signal S4.

The third arithmetic circuit 43 has normalization circuits N1 to N4, an adder circuit 43A, a subtracter circuit 43B and an operation part 43C. The normalization circuits N1 to N4 have an input end and an output end, respectively. The adder circuit 43A, the subtracter circuit 43B and the operation part 43C have two input ends and one output end, respectively.

The output end of the first arithmetic circuit 41 is connected to the input end of the normalization circuit N1. The output end of the second arithmetic circuit 42 is connected to the input end of the normalization circuit N2. The output ends of the normalization circuits N1 and N2 are connected to the two input ends of the adder circuit 43A, respectively. The output ends of the normalization circuits N1 and N2 are connected to the two input ends of the adder circuit 43A, respectively. The output end of the adder circuit 43A is connected to the input end of the normalization circuit N3, and the output end of the subtracter circuit 43B is connected to the input end of the normalization circuit N4. The output ends of the normalization circuits N3 and N4 are connected to the two input ends of the operation part 43C, respectively.

The normalization circuit N1 outputs a value where the first post-arithmetic signal Sa1 is normalized to the adder circuit 43A and the subtracter circuit 43B. The normalization circuit N2 outputs a value where the second post-arithmetic signal Sa2 is normalized to the adder circuit 43A and the subtracter circuit 43B. The normalization circuits N1 and N2 normalize the first and second post-arithmetic signals Sa1 and Sa2 so as to adjust the maximum values for the first and second post-arithmetic signals Sa1 and Sa2 both to be 1, and so as to adjust their minimum values both to be −1. In the present embodiment, the value where the first post-arithmetic signal Sa1 is normalized is $\sin(\theta+\pi/4)$, and the value where the second post-arithmetic signal Sa2 is normalized is $\sin(\theta-\pi/4)$. Furthermore, θ is an angle between a segment connecting the connecting points J12 and J14 and an external magnetic field.

The adder circuit 43A performs an operation to obtain a sum of the value where the first post-arithmetic signal Sa1 is normalized and the value where the second post-arithmetic signal Sa2 is normalized, and generates an addition signal S11. The subtracter circuit 43B performs an operation to obtain a difference between the value where the first post-arithmetic signal Sa1 is normalized and the value where the second post-arithmetic signal Sa2 is normalized, and generates a subtraction signal S12. The addition signal S11 and the subtraction signal S12 are expressed with the formulas below.

$$S11 = \sin(\theta - \pi/4)\sin(\theta + \pi/4)$$
$$= 2\sin\theta \cdot \cos(-\pi/4)$$
$$= 1.41\sin\theta$$

$$S12 = \sin(\theta + \pi/4) - \sin(\theta - \pi/4)$$
$$= 2\cos\theta \cdot \sin(\pi/4)$$
$$= 1.41\cos\theta$$

The normalization circuit N3 outputs the value S21 where the addition signal S11 is normalized to the operation part 43C. The normalization circuit N4 outputs the value S22 where the addition signal S12 is normalized to the operation part 43C. For example, the normalization circuits N3 and N4 normalize the addition signal S11 and the subtraction signal S12 so as to adjust the maximum values for the addition signal S11 and the subtraction signal S12 both to be 1, and so as to adjust their minimum values both to be −1. In the present embodiment, the value S21 where the addition signal S11 is normalized is sin θ, and the value where S22 where the subtraction signal S12 is normalized is cos θ.

The operation part 43C calculates a rotation angle detection value θs having a correspondence relationship with the angle θ based upon the values S21 and S22. For example, the operation part 43C calculates the rotation angle detection value Os using the formula below $$\theta s = \arctan(S21/S22)$$

Within the range where the rotation angle detection value θs is 0° or greater and less than 360°, there are two different values by 180° in the solution of the rotation angle detection value θs using the formula above. However, a true value for the rotation angle detection value θs can be determined as either one of the two solutions by combining positive and negative values of S21 and S22. In other words, when the value S21 is a positive value, the rotation angle detection value θs is greater than 0° and smaller than 180°. When the value S21 is a negative value, the rotation angle detection value θs is greater than 180° and smaller than 360°. When the value S22 is a positive value, the rotation angle detection value θs is within a range that is 0° or greater and less than 90°, and, that is greater than 270° but 360° or less. When the value S22 is a negative value, the rotation angle detection value θs is greater than 90° and smaller than 270°. The operation part 43C can obtain a true value for the rotation angle detection value θs within the range of 0° or greater but less than 360° by combining positive and negative values of S21 and S22.

As described above, in the rotation angle sensing device 1 according to the first embodiment, a region (the magnetic sensor arrangeable region 6) where the amplitudes of the magnetic field intensities $H_r$ and $H_\theta$ in the radial direction and the circumferential direction become substantially identical is formed within the space surrounded by the concave side surface 2C of the magnet 2. When the magnetic sensor part 3 is placed in this magnetic sensor arrangeable region 6, a detection error of the rotation angle can be reduced. Further, the rotation angle sensing device 1 is configured to calculate a rotation angle according to the magnetic field intensity $H_r$ in the radial direction and the magnetic field intensity $H_\theta$ in the circumferential direction, and the magnetic sensor arrangeable region 6 is sufficiently greater than the magnetic sensor part 3; thus, generation of a detection error of the rotation angle due to shaft wobble of the shaft 5 can be prevented. In addition, since the rotation angle detection value θs is calculated from the magnetic field intensity $H_r$ in the radial direction and the magnetic field intensity $H_\theta$ in the circumferential direction, it also becomes possible to reduce the volume of the magnet 2.

Second Embodiment

Figure 16:
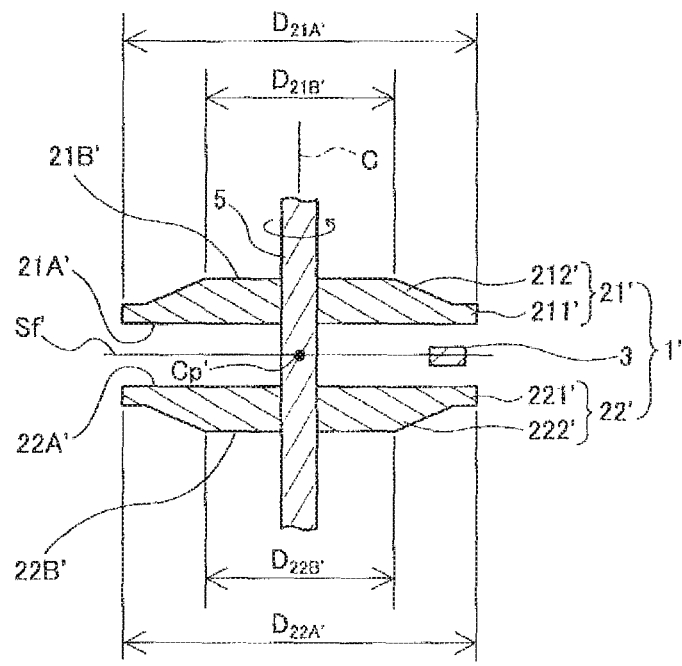
FIG. 16 is a cross-sectional view showing the schematic configuration of the rotation angle sensing device in the second embodiment of the present invention.
Figure 17:
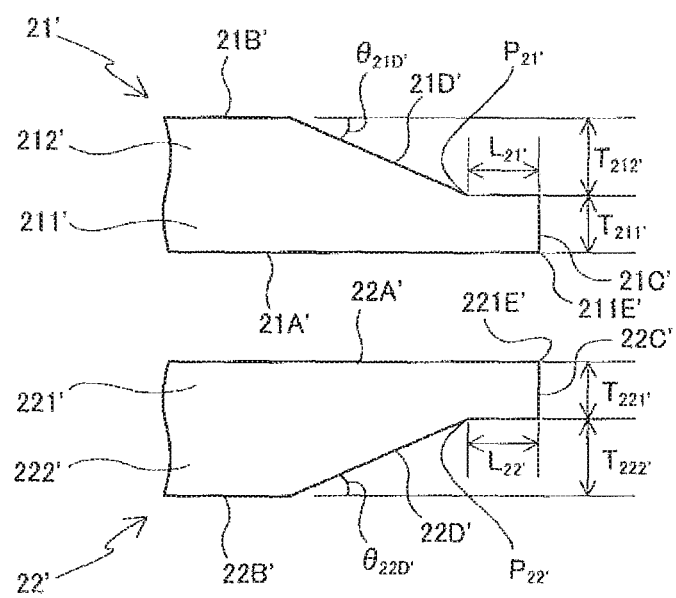
FIG. 17 is a side view showing the schematic configuration of the magnet in the second embodiment of the present invention.

The second embodiment of the present invention is explained in detail with reference to the drawings. FIG. 16 is a cross-sectional view showing the schematic configuration of a rotation angle sensing device relating to the second embodiment, and FIG. 17 is a partially enlarged side view showing a main part of the magnets in the second embodiment. Furthermore, in the second embodiment, any components similar to those in the first embodiment are identified by the same symbols, and a detailed explanation shall be omitted.

As shown in FIG. 16, a rotation angle sensing device 1' relating to the second embodiment is supported by and fixed to the shaft 5, and is provided with a first magnet 21' and a second magnet 22' that rotate integrally with the shaft 5; the magnetic sensor part 3 that outputs a sensor signal based upon a change of a magnetic field in association with the rotation of the first magnet 21' and the second magnet 22; and the rotation angle sensing part 4 (see FIG. 15) that detects a rotation angle of a rotating body based upon the sensor signal output from the magnetic sensor part 3.

The first magnet 21' has a first surface 21A' that is substantially orthogonal to the rotary shaft C (shaft center) of the shaft 5 and a second surface 21B' that is opposite to the first surface 21A, and the first surface 21A' and the second surface 21B' are substantially circular when viewed along the axial direction of the rotary shaft C of the shaft 5, and the first surface 21A' has a size to physically include the second surface 21B'.

The second magnet 22' has a first surface 22A' that is substantially orthogonal to the rotary shaft C (shaft center) of the shaft 5 and a second surface 22B' that is opposite to the first surface 22A, and the first surface 22A' and the second surface 22B' are substantially circular when viewed along the axial direction of the rotary shaft C of the shaft 5, and the first surface 22A' has a size to physically include the second surface 22B'.

The first magnet 21' and the second magnet 22' conform to centroids (center) of the first surfaces 21A' and 22A' and the second surfaces 21B' and 22B' to the rotary shaft C of the shaft 5, respectively, and, are supported by and fixed to the shaft 5 so that the first surfaces 21A' and 22A' face each other at predetermined intervals.

The first magnet 21' and the second magnet 22' are magnetized in the direction that is orthogonal to the rotary shaft C of the shaft 5 (in-plane direction of the first surfaces 21A' and 22A' and the second surfaces 21B' and 22B'). Furthermore, in the second embodiment, the first magnet 21' and the second magnet 22' that are magnetized in the direction orthogonal to the rotary shaft C are exemplified, but shall not be limited to such a mode. For example, the first magnet 21' and the second magnet 22' should have a magnetization vector component in the direction orthogonal to the rotary shaft C, but it is preferable that the magnetization directions of the first magnet 21' and the second magnet 22' are substantially orthogonal to the rotary shaft C (an angle with the rotary shaft C in the magnetization direction is approximately 90±10°), respectively.

Figure 18:
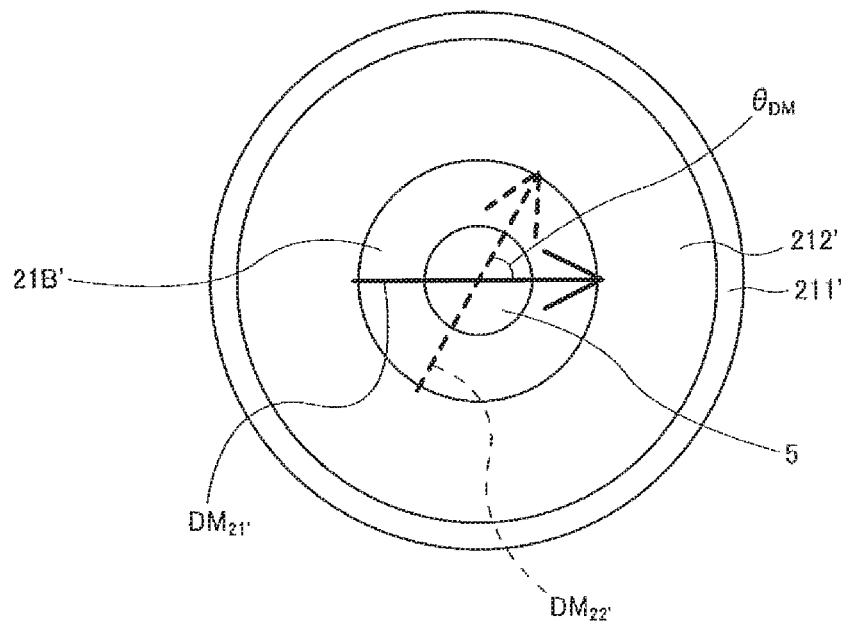
FIG. 18 is a schematic view viewed from the second surface side of the first magnet indicating a magnetization direction of the first magnet and that of the second magnet in the second embodiment of the present invention.

When a plane that is orthogonal to the rotary shaft C is set and a first arrow $DM_{21'}$ indicating the magnetization direction of the first magnet 21' and a second arrow $DM_{22'}$ indicating the magnetization direction of the second magnet 22' are projected onto the plane, the directions of the first arrow $DM_{21}$ and the second arrow $DM_{22'}$ may be identical to each other, but it is more preferable that they are different from each other as shown in FIG. 18, and an angle $\theta_{DM}$ between a first segment along the first arrow $DM_{21'}$ projected onto the plane and a second segment along the second arrow $DM_{22'}$ (angle viewed from a direction that is parallel with the rotary shaft C) is preferably $(180/(N+1))°$ or $(180×N/(N+1))°$ (N is an integer greater than or equal to 1). From a magnetic field $M_r$ in the radial direction and a magnetic field $M_\theta$ in the circumferential direction relating to the magnetic sensor part 3, a magnetic field angle $\theta_M$ relating to the magnetic sensor part 3 is defined by the formula "$\theta_M = \arctan(M_\theta/M_r)$". Then, it is ideal in the rotation angle sensing device 1' that the angles of rotation θ of the first and second magnets 21' and 22' placed in the shaft 5 and the magnetic field angle $\theta_M$ are identical. However, in actuality, due to an effect of high-order components in each magnetic field by the first and second magnets 21' and 22', distortion is generated to the magnetic fields ($M_r$ and $M_\theta$) relating to the magnetic sensor part 3, and an error is generated in the rotation angle that is detected by the magnetic sensor part 3. However, because the first segment along the first arrow $DM_{21'}$ and the second segment along the second arrow $DM_{22'}$ projected onto the plane form a predetermined angle $\theta_{DM}$, the high-order components in the magnetic field by the first and second magnets 21' and 22' can be mutually overridden; thus, the error of the rotation angle that is detected by the magnetic sensor part 3 can be reduced.

The first magnet 21' and the second magnet 22' in the second embodiment have bases 211' and 221' having the first surfaces 21A' and 22A', and convex parts 212' and 222' that have the second surfaces 21B' and 22B', and that protrude toward the second surfaces 21B and 22B' from the bases 211' and 221', respectively. The bases 211' and 221' have side surfaces 21C and 22C that are continued to outer circumferential edges 21E and 22E of the first surfaces 21A' and 22A', and that are substantially parallel to the rotary shaft C of the shaft 5 (see FIG. 17), respectively. The convex parts 212' and 222' protrude toward the sides of the second surfaces 21B' and 22B' from positions $P_{21'}$ and $P_{22'}$ in the radial direction of the first magnet 21' and the second magnet 22' more inwardly than the side surfaces 21C' and 22C' of the bases 211' and 221', and have inclined side surfaces 21D' and 22D' that are inclined at predetermined angles $\theta_{21D'}$ and $\theta_{22D'}$ inwardly in the radial direction of the first magnet 21' and the second magnet 22'.

Thicknesses $T_{211'}$ and $T_{221'}$ of the bases 211' and 221' in the first magnet 21' and the second magnet 22' are not particularly restricted, but, for example, can be set to approximately 1 mm to 4 mm. Thicknesses $T_{212'}$ and $T_{222'}$ of the convex parts 212' and 222' are also not particularly restricted, but, for example, can be set to approximately 1 mm to 4 mm.

Ratios of diameters $D_{21B'}$ and $D_{22B'}$ of the second surfaces 21B' and 22B' to diameters $D_{21B'}$ and $D_{22B'}$ of the first surfaces 21B' and 22B' in the first magnet 21' and the second magnet 22' are 1:2 or greater, respectively. If those ratios are within the range above, the amplitude of the magnetic field intensity $H_r$ in the radial direction and that of the magnetic field intensity $H_\theta$ in the circumferential direction that are detected by the magnetic sensor part 3 in association with rotation of the first magnet 21' and the second magnet 22' can be substantially identical to each other. Furthermore, the diameters $D_{21B'}$ and $D_{22B'}$ of the second surfaces 21B' and 22B' can be set, for example, to approximately 8 mm to 20 mm, and the diameters $D_{21A'}$ and $D_{22A'}$ of the first surfaces 21A' and 22A' can be set, for example, to approximately 16 mm to 40 mm.

Lengths $L_{21'}$ and $L_{22'}$ (lengths along the radial direction of the first magnet 21' and the second magnet 22') toward upward positions of the inclined side surfaces 21D' and 22D' of the convex parts 212' and 222' (positions $P_{21'}$ and $P_{22'}$ inward in the radial direction of the first magnet 21' and the second magnet 22C') from the side surfaces 21C' and 22C' of the bases 211' and 221' can be set, for example, to approximately 8 mm or less, and preferably approximately 1 mm to 4 mm.

In the first magnet 21' and the second magnet 22' in the second embodiment, ratios of volumes $V_{211'}$ and $V_{221'}$ of the bases 211' and 221' to volumes $V_{212'}$ and $V_{222'}$ of the convex parts 212' and 222' ($V_{211'}:V_{212'}$, $V_{22'}:V_{222'}$) are preferably 1:0.2 or greater, and are more preferably 1:0.2 to 5, and are particularly preferably 1:0.2 to 1. If the volume ratios ($V_{211'}$:$V_{212'}$, $V_{221'}$:$V_{222'}$) are within the range above, a region where amplitude of the magnetic field intensity $H_r$ in the radial direction, and that of the magnetic field intensity $H_θ$ in the circumferential direction, are substantially identical to each other is formed between the diameters $D_{21B'}$ and $D_{22B'}$ of outer circumferential circles of the convex parts 212' and 222' and the diameters $D_{21A'}$ and $D_{22A'}$ of the outer circumferential circles of the bases 211' and 221'.

The first magnet 21' and the second magnet 22' in the second embodiment have a plane-symmetrical shape where a surface Sf' that passes a center point Cp' between the first surfaces 21A' and 22A' of the rotary shaft C of the shaft 5 in the axial direction, is orthogonal to the rotary shaft C and is considered as a symmetric plane (see FIG. 16). Because the first magnet 21' and the second magnet 22' have a plane-symmetrical shape, when a third virtual plane VF3, which is orthogonal to the rotary shaft C and is circular centering on the rotary shaft, is set within a space interposed by a first virtual plane VF1 including the first surface 21A' (see FIG. 23B) and a second virtual plane VF2 including the first surface 22A' (see FIG. 23B), a region can be formed where the amplitude of the magnetic field intensity $H_r$ in the radial direction and that of the magnetic field intensity $H_θ$ in the circumferential direction at a predetermined position on the third virtual plane VF3 are substantially identical to each other.

Figure 19:
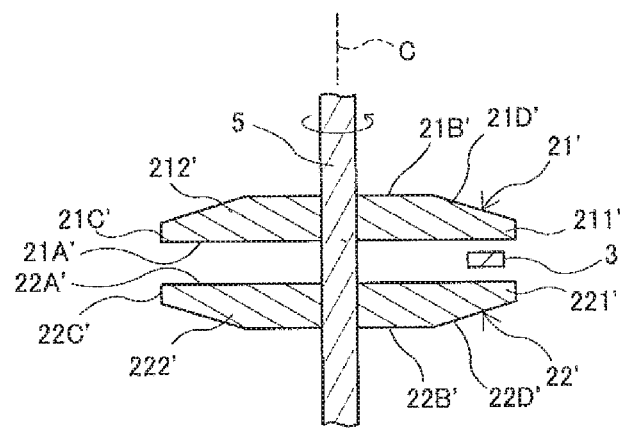
FIG. 19 is a cross-sectional view showing another mode (Part 1) of the magnet in the second embodiment of the present invention.
Figure 20:
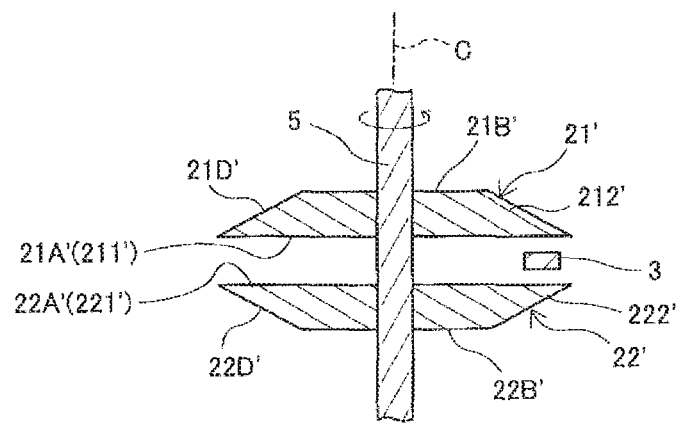
FIG. 20 is a cross-sectional view showing another mode (Part 2) of the magnet in the second embodiment of the present invention.
Figure 21:
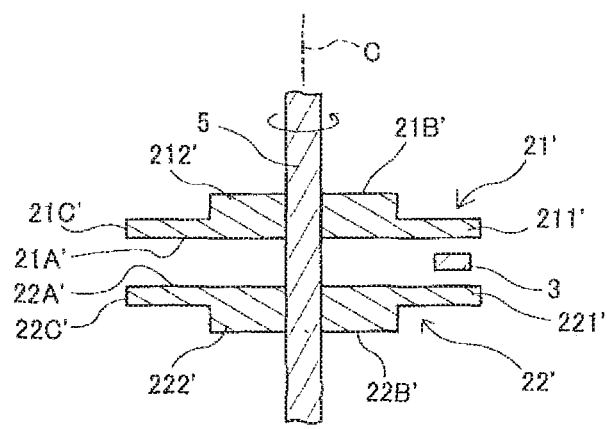
FIG. 21 is a cross-sectional view showing another mode (Part 3) of the magnet in the first embodiment of the present invention.
Figure 22:
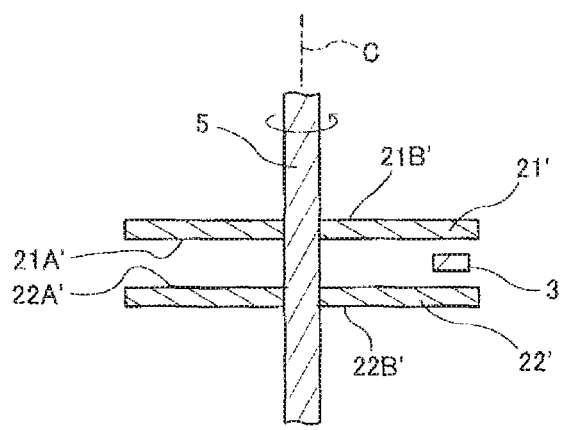
FIG. 22 is a cross-sectional view showing another mode (Part 4) of the magnet in the first embodiment of the present invention.

Furthermore, the first magnet 21' and the second magnet 22' in the second embodiment shall not be limited to the modes shown in FIG. 16 and FIG. 17. For example, as shown in FIG. 19, the first magnet 21' and the second magnet 22' may be in a mode having the bases 211' and 221' including the side surfaces 21C' and 22C' that are continued to the outer circumferential edges of the first surfaces 21A' and 22A', and the convex parts 212' and 222' including the inclined side surfaces 21D' and 22D' and the second surfaces 21B' and 22B' that are continued at the upper edge of the side surfaces 21C' and 22C', respectively. Further, as shown in FIG. 20, the first magnet 21' and the second magnet 22' may be in a mode with a substantially trapezoidal shape of a cross section having the bases 211' and 221' including the first surfaces 21A' and 22A', the convex parts 212' and 222' including the inclined side surfaces 21D' and 22D' and the second surfaces 21B' and 22B' that are continued to the outer circumferential edges of the first surfaces 21A' and 22A'. In addition, as shown in FIG. 21, the first magnet 21' and the second magnet 22' may be in a mode with a substantially step shape of a cross section, having the bases 211' and 221' including the first surfaces 21A' and 22A' and the side surfaces 21C' and 22C' that are continued to the outer circumferential edges of the first surfaces 21A' and 22A', and the convex parts 212' and 222' including a side surface that rises in a direction that is substantially parallel with the rotary shaft C of the shaft 5 from the position in the radial direction of the first magnet 21' and the second magnet 22' more inward than the side surfaces 21C' and 22C' and the second surfaces 21B' and 22B'. In addition, as shown in FIG. 22, the first magnet 21' and the second magnet 22' may be in a substantially-circular disk mode having the first surface 21A' and the second surface 21B' facing the first surface 21A.

The magnetic sensor part 3 in the second embodiment is placed at a position where the amplitude of the magnetic field intensity $H_r$ in the radial direction and that of the magnetic field intensity $H_θ$ in the circumferential direction that are detected by the magnetic sensor part 3 in association with rotation of the first magnet 21' and the second magnet 22' are substantially identical to each other.

Figure 23A:
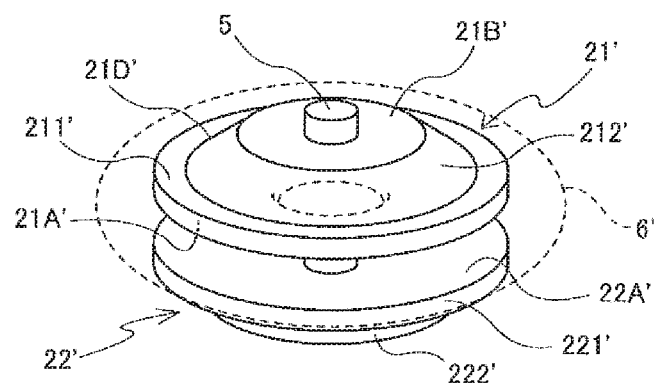
FIG. 23A is a perspective view schematically showing the magnets and the magnetic sensor arrangeable region in the first embodiment of the present invention.
Figure 23B:
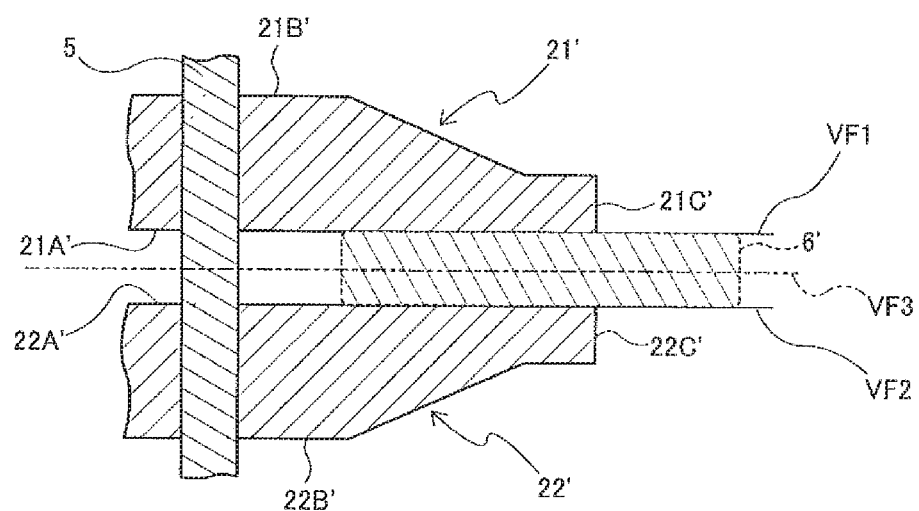
FIG. 23B is a cross-sectional view of FIG. 23A.

As shown in FIG. 23A and FIG. 23B, within a space interposed by the first virtual plane VF1 including the first surface 21A' of the first magnet 21' and the second plane VF2 including the first surface 22A' of the second magnet 22' in the second embodiment, when the third virtual plane VF3, which is orthogonal to the rotary shaft C and is circularly centered upon the rotary shaft C, is set within the space, a region where the amplitudes of magnetic field intensities $H_r$ and $H_θ$ in the radial direction and the circumferential direction at a predetermined position on the third virtual plane VF3 are substantially identical to each other (magnetic sensor arrangeable region 6'), is formed.

This magnetic sensor arrangeable region 6' is formed between a position in the radial direction more inward than the side surfaces 21C' and 22C' of the first magnet 21' and the second magnet 22' and a position in the radial direction more outward than the side surfaces 21C' and 22C'. To be more specific, the position inward in the radial direction is a position at approximately 1 mm to 15 mm along the radial direction from the side surfaces 21C' and 22C', and the outward position in the radial direction is a position at approximately 1 mm to 5 mm along the radial direction from the side surfaces 21C and 22C.

In the second embodiment, because the magnetic sensor part 3 is placed in this magnetic sensor arrangeable region 6 and the amplitude of the magnetic field intensity $H_r$ in the radial direction and that of the magnetic field intensity $H_θ$ in the circumferential direction at a predetermined position on the third circular virtual plane VF3, which is circular, can be substantially identical to each other (see FIG. 12), a detection error in the rotation angle by the rotation angle sensing device 1 relating to the second embodiment can be reduced.

It is particularly preferable that the magnetic sensor part 3 is placed more outwardly in the radial direction than the side surfaces 21C' and 22C' of the first magnet 21' and the second magnet 22' within the magnetic sensor arrangeable region 6'. In other words, the magnetic sensor part 3 will not be interposed by the first magnet 21' and the second magnet 22'. Because the magnetic sensor part 3 is placed at such position, a detection error in the roation angle by the rotation angle sensing device 1 can be reduced.

The embodiment explained above is described for facilitating the understanding of the present invention, and it is not described for restricting the present invention. Therefore, each element disclosed in the embodiments encompasses all design changes and equivalences belonging to the technical scope of the present invention.

For example, in the first and second embodiments, the magnetic sensor part 3 may detect either the magnetic field intensity $H_r$ in the radial direction or the magnetic field intensity $H_θ$ in the circumferential direction, and the rotation angle detection value θs may be calculated by the rotation angle sensing part 4 based upon either the magnetic field intensity $H_r$ in the radial direction or the magnetic field intensity $H_θ$ in the circumferential direction and the magnetic field intensity $H_z$ in a direction along the rotary shaft C of the shaft 5.

EXAMPLES

Hereafter, the present invention will be explained in further detail with reference to examples and the like, but the present invention shall not be restricted to the examples and the like below.

Example 1

Figure 24:
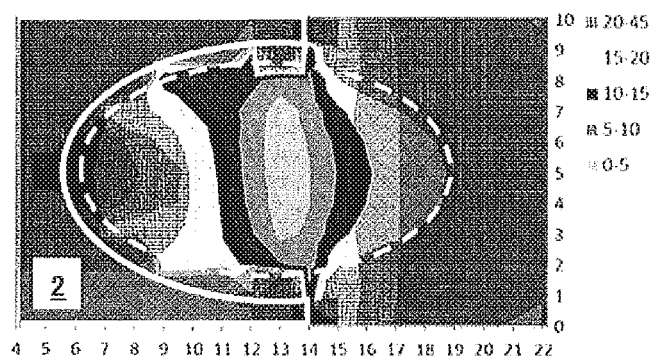
FIG. 24 shows a simulation result of Example 1.

In the rotation angle sensing device 1 having the configurations shown in FIG. 1, FIG. 2A and FIG. 3A, magnetic field distributions of the magnet 2 and their angular error distributions based upon the magnetic field distributions were obtained by simulation using a finite element method (FEM). Furthermore, the thickness $T_2$ of the magnet 2 was set at 10 mm, and an angle $\theta_{12}$ between a first line L1 and a second line L2 was set at 50°. Results are shown in FIG. 24.

Example 2

Figure 25:
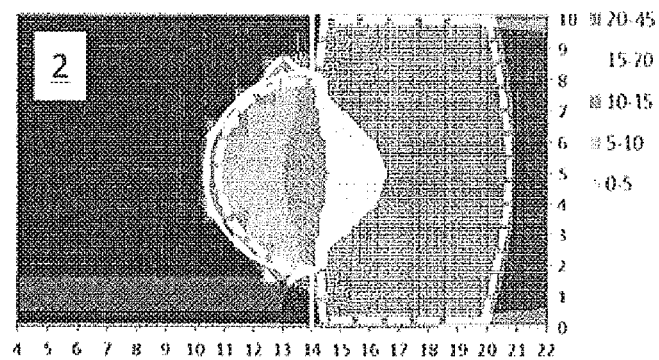
FIG. 25 shows a simulation result of Example 2.

The magnetic field distribution of the magnet 2 and its angular error distribution based upon the magnetic field distribution were obtained by simulation, as similar to Example 1, except for setting the angle $\theta_{12}$ between the first line L1 and the second line L2 at 90°. Results are shown in FIG. 25.

Example 3

Figure 26:
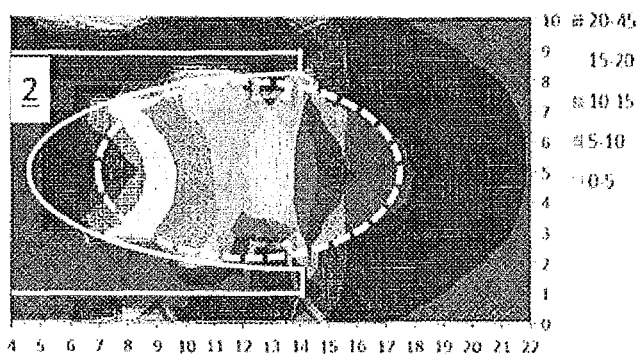
FIG. 26 shows a simulation result of Example 3.

The magnetic field distribution of the magnet 2 and the angular error distribution based upon the magnetic field distribution were obtained by simulation, as similar to Example 1, except for setting the thickness $T_2$ of the magnet 2 at 8 mm and setting the angle $\theta_{12}$ between the first line L1 and the second line L2 at 40°. Results are shown in FIG. 26.

Example 4

Figure 27:
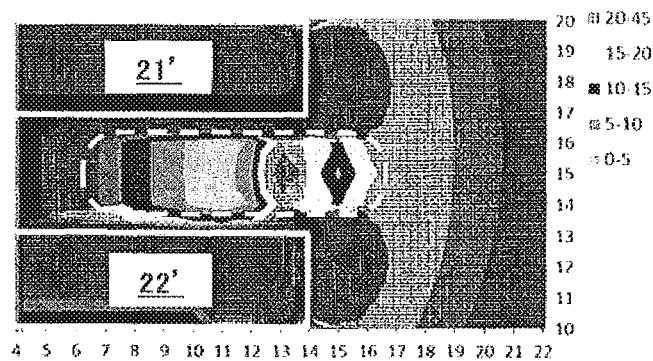
FIG. 27 shows a simulation result of Example 4.

The magnetic field distributions by the first and second magnets 21' and 22' and the angular error distribution based upon those magnetic field distributions were obtained by simulation, as similar to Example 1, except for setting thicknesses $T_{211'}$ and $T_{221'}$ of the bases 211' and 221' in the first magnet 21' and the second magnet 22' at 2.25 mm, thicknesses $T_{212'}$ and $T_{222'}$ of the convex parts 212' and 222' at 2.75 mm, lengths $L_{21'}$ and $L_{22'}$ from the side surfaces 21C' and 22C' to the rising positions $P_{21'}$ and $P_{22'}$ at 2.0 mm, diameters $D_{21A'}$ and $D_{22A'}$ of the first surfaces 21A' and 22A' at 28 mm, diameters $D_{21B'}$ and $D_{22B'}$ of the second surfaces 21B' and 22B' at 12 mm, inclination angles $\theta_{21D'}$ and $\theta_{22D'}$ of the inclined side surfaces 21D' and 22D' at 25°, volume at 1.86 cm³ (volume ratios of the bases 211' and 221' to the convex parts 212' and 222' ($V_{211'}:V_{212'}$ and $V_{221'}:V_{222'}$)=1:0.46), arranging the magnetization direction $DM_{21'}$ of the first magnet 21' and the magnetization direction $DM_{22'}$ of the second magnet 22' to be parallel, and using the first magnet 21' and the second magnet 22' having configurations shown in FIG. 16 and FIG. 17. Results are shown in FIG. 27.

Example 5

Figure 28:
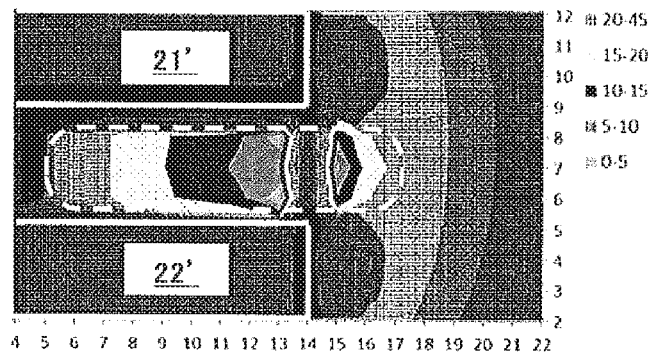
FIG. 28 shows a simulation result of Example 5.

The magnetic field distributions by the first and second magnets 21' and 22' and the angular error distribution based upon those magnetic field distributions were obtained by simulation, as similar to Example 1, except for setting thicknesses of the first magnet 21' and the second magnet 22' at 3 mm, diameters $D_{21A'}$, $D_{22A'}$, $D_{21B'}$ and $D_{22B'}$ of the first surfaces 21A' and 22A' and the second surfaces 21B' and D22B' at 28 mm, arranging the magnetization direction $DM_{21'}$ of the first magnet 21' and the magnetization direction $DM_{22'}$ of the second magnet 22' to be parallel, and using the first magnet 21' and the second magnet 22' having configuration shown in FIG. 22. Results are shown in FIG. 28.

Comparative Example 1

Figure 29:
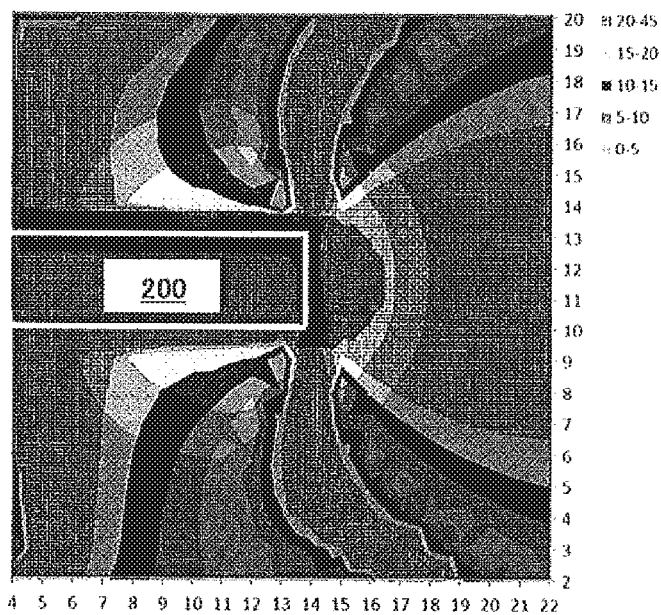
FIG. 29 shows a simulation result of Comparative Example 1.
Figure 31:
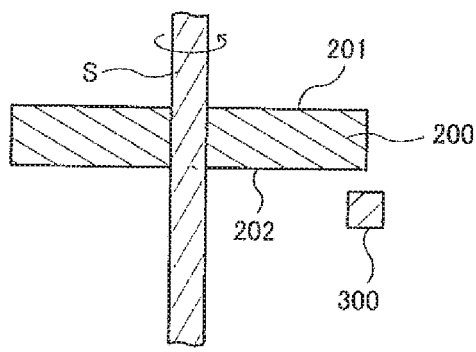
FIG. 31 is a cross-sectional view (Part 1) showing a schematic configuration of a conventional rotation angle sensing device.
Figure 32:
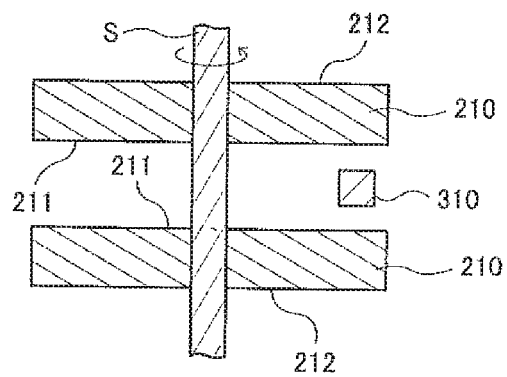
FIG. 32 is a cross-sectional view (Part 2) showing a schematic configuration of a conventional rotation angle sensing device.

The magnetic field distribution of a magnet 200 and the angular error distribution based upon the magnetic field distribution were obtained by simulation, as similar to Example 1, except for setting the thickness of the magnet 200 mm at 3 mm, and the diameters of a first surface 201 and a second surface 202 at 28 mm, and using the magnet 200 having the configuration shown in FIG. 31. Results are shown in FIG. 29.

FIGS. 24 to 29 are charts showing an angular error distribution in the vicinity of the outer circumferential edges of the magnets 2 and 200 and first and second magnets 21' and 22' obtained by the simulation of Examples 1 to 5 and Comparative Example 1. In FIGS. 24 to 28, the regions with the lowest brightness (dark gray region) in the peripheries of the magnets 2 and 200 and the first and second magnets 21' and 22' are regions where the magnetic field intensities $H_r$ and $H_\theta$ in the radial direction and the circumferential direction are less than 15 mT, and the regions with the highest brightness (bright region) are regions where the magnetic field intensities $H_r$ and $H_\theta$ in the radial direction and the circumferential direction are 20 mT or greater, and the regions with intermediate brightness of those (bright gray region) are regions where the magnetic field intensities $H_r$ and $H_\theta$ in the radial direction and the circumferential direction are 15 mT or greater but less than 20 mT. The regions surrounded with a broken line are regions with excellent angular error, are regions having magnetic field intensities (magnetic field intensities $H_r$ and $H_\theta$=20 to 80 mT) that are detectable by the magnetic sensor part 3, and are regions that can be magnetic sensor arrangeable regions 6 and 6'.

According to the results shown in FIGS. 24 to 29, in Examples 1 to 3, it was determined that a rotation angle would be accurately detectable based upon the magnetic field intensities $H_r$ and $H_\theta$ in the radial direction and/or the circumferential direction within a space surrounded by the concave side surface 2C of the magnet 2.

Further, in Examples 4 to 5, it was determined that a rotation angle would be accurately detectable based upon the magnetic field intensities $H_r$ and $H_\theta$ in the radial direction and/or the circumferential direction within a space surrounded by the first virtual plane VF1 including the first surface 21A' of the first magnet 21' and the second virtual plane VF2 including the first surface 22A' of the second magnet 22'. Further, compared to the results of Comparative Example 1, in Example 3, the region where a rotation angle that would be accurately detectable based upon the magnetic field intensities $H_r$ and $H_\theta$ in the radial direction and/or the circumferential direction (magnetic sensor arrangeable region 6') became greater.

Test Example 1

In Example 4, when a plane orthogonal to the rotary shaft C is set and the first arrow $DM_{21'}$ indicating the magnetization direction of the first magnet 21' and the second arrow $DM_{22'}$ indicating the magnetization direction of the second magnet 22' are projected onto the plane, an angle $\theta_{DM}$ between the first segment along the first arrow $DM_{21'}$ and the second segment $DM_{22'}$ projected onto the plane is varied at 15° intervals within the range of 30° and 150°, and a relationship between the rotation angle $\theta$ of the first and second magnets 21' and 22' and the magnetic field angle $\theta_M$ (=arc tan($M_\theta/M_r$)) was obtained by a simulation. Results are shown in FIG. 30.

Figure 30:
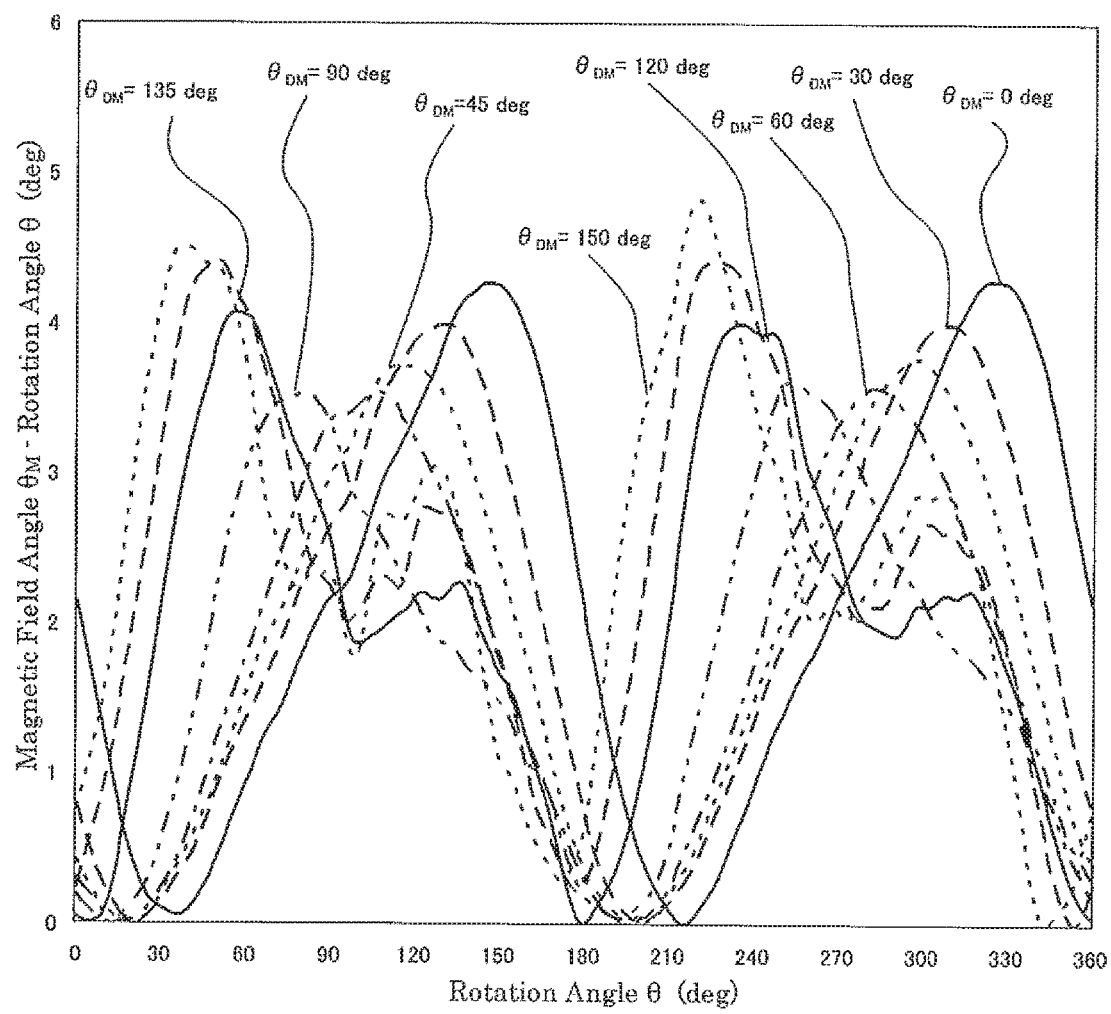
FIG. 30 shows a simulation result of Test Example 1.

In the graph shown in FIG. 30, the horizontal axis represents a rotation angle θ of the first and second magnets 21' and 22', and the vertical axis represents a difference between the magnetic field angle $\theta_M$ and the rotation angle θ relating to the magnetic sensor part 3 (a shift length of the magnetic field angle $\theta_M$ from the rotation angle θ). According to the graph shown in FIG. 30, it was confirmed that when a plane orthogonal to the rotary shaft C is set, and the first arrow $DM_{21'}$ indicating the magnetization direction of the first magnet 21' and the second arrow $DM_{22'}$ indicating the magnetization direction of the second magnet 22' are projected on the plane, an amplitude of the shift distance of the magnetic field angle $\theta_M$ from the rotation angle θ would be minimum by setting the angle $\theta_{DM}$ between the first segment along the first arrow $DM_{21'}$ and the second segment along the second arrow $DM_{22'}$ projected onto the plane to a predetermined angle. According to this result, it was determined that when a plane orthogonal to the rotary shaft C is set and the first arrow $DM_{21'}$ indicating the magnetization direction of the first magnet 21' and the second arrow $DM_{22'}$ indicating the magnetization direction of the second magnet 22' are projected on the plane, the detection error in the rotation angle by the magnetic sensor part 3 would be reduceable by setting the angle $\theta_{DM}$ between the first segment along the first arrow $DM_{21'}$ and the second segment along the second arrow $DM_{22'}$ projected onto the plane to a predetermined angle.

DESCRIPTION OF SYMBOLS

1 . . . rotation angle sensing device
2 . . . magnet
21' . . . first magnet
22' . . . second magnet
2A, 21A, 22A . . . first surface
2B, 21B', 22B' . . . second surface
2C . . . concave side surface
21D', 22D' . . . inclined side surface
3 . . . magnetic sensor part
4 . . . rotation angle sensing part

What is claimed is:

1. A rotation angle sensing device, comprising:
a magnet that is placed to be integrally rotatable with a rotary shaft of a rotating body in association with rotation of the rotating body, and that has a component with a magnetization vector in a direction orthogonal to the rotary shaft,
a magnetic sensor part that outputs a sensor signal based upon a change of a magnetic field in association with rotation of the magnet, and
a rotation angle sensing part that detects a rotation angle of the rotating body based upon the sensor signal output by the magnetic sensor part, wherein
the magnet has a first surface substantially orthogonal to the rotary shaft and a second surface facing the first surface, and a concave side surface that is continuous throughout all circumferences in the circumferential direction; and
a virtual plane that is orthogonal to the rotary shaft and that is circularly centered upon the rotary shaft is set within a space surrounded by the concave side surface,
the magnetic sensor part is placed within the space and at a position where an amplitude of a magnetic field intensity $H_r$ in a radial direction and an amplitude of a magnetic field intensity $H_\theta$ in a circumferential direction on the virtual plane are substantially identical to each other, and the magnetic sensor part outputs either the magnetic field intensity $H_r$ in the radial direction or the magnetic field intensity $H_\theta$ in the circumferential direction as the sensor signal.

2. The rotation angle sensing device according to claim 1, wherein on a cross sectional surface of the magnet along the axial direction of the rotary shaft, the concave side surface is substantially U-shaped, substantially V-shaped or substantially angularly U-shaped outwardly in the radial direction of the magnet.

3. The rotation angle sensing device according to claim 2, wherein
first, second, and third points are points located on the concave side surface where the concave side surface intersects a cross sectional plane of the magnet,
the cross sectional plane includes an axis of the rotary shaft,
the third point is situated between the first point and the second point on the concave side surface where a distance between the concave side surface and the axis of the rotary shaft is minimized,
the first point is positioned on a first side of the third point in the axial direction of the rotary shaft and is located on the concave side surface where a distance between the concave side surface and the axis of the rotary shaft is maximized,
the second point is positioned on a second side of the third point in the axial direction of the rotary shaft and is located on the concave side surface where a distance between the concave side surface and the axis of the rotary shaft is maximized, and
an angle between a first line connecting the first point and the third point and a second line connecting the second point and the third point, is 40° to 90°.

4. The rotation angle sensing device according to claim 1, wherein the magnet has a plane-symmetrical shape when a plane that is orthogonal to the rotary shaft passing through a center point of the magnet in the axial direction of the rotary shaft is considered as a symmetric surface.

5. The rotation angle sensing device according to claim 4, wherein the magnetic sensor part is placed on the symmetric surface.

6. A rotation angle sensing device, comprising:
a first magnet and a second magnet that are placed to be integrally rotatable with a rotary shaft of a rotating body in association with the rotation of the rotary body, and that have a component with a magnetization vector orthogonal to the rotary shaft, respectively,
a magnetic sensor part that outputs a sensor signal based upon a change of a magnetic field in association with the rotation of the first magnet and the second magnet, and
a rotation angle sensing part that detects a rotation angle of the rotating body based upon the sensor signal output by the magnetic sensor part, wherein
each of the first magnet and the second magnet has a first surface that is substantially orthogonal to the rotary shaft, respectively, and the first surfaces are placed so that first surfaces oppose one another at a predetermined interval along an axial direction of the rotary shaft;
a third virtual plane, which is orthogonal to the rotary shaft and is circularly centered upon the rotary shaft is set within a space between a first virtual plane, which includes the first surface of the first magnet, and a second virtual plane, which includes the first surface of the second magnet, and the magnetic sensor part is placed within the space and at a position where an amplitude of a magnetic field intensity $H_r$ in a radial direction and an amplitude of a magnetic field intensity $H_\theta$ in a circumferential direction are substantially identical to each other, and the magnetic sensor part outputs either the magnetic field intensity $H_r$ in the radial direction or the magnetic field intensity $H_\theta$ in the circumferential direction as the sensor signal.

7. The rotation angle sensing device according to claim 6, wherein the magnetic sensor part is placed substantially at the center in the axial direction of the rotary shaft between the first virtual plane and the second virtual plane.

8. The rotation angle sensing device according to claim 6, wherein the magnetic sensor part is placed at a position farther from the rotary shaft than outer edge parts of the first surfaces of the first magnet and the second magnet.

9. The rotation angle sensing device according to claim 6, wherein the first magnet and the second magnet have a plane-symmetrical shape when a plane that is orthogonal to the rotary shaft passing a center point between their first surfaces in the axial direction of the rotary shaft is considered as a symmetrical surface.

10. The rotation angle sensing device according to claim 6, wherein when a plane that is orthogonal to the rotary shaft is set and a magnetization direction of the first magnet and that of the second magnet are indicated with a first arrow and a second arrow, respectively, and the first arrow and the second arrow are projected onto the plane; a direction of a first projected arrow where the first arrow is projected on the plane and a direction of a second projected arrow where the second arrow is projected on the plane are different from each other.

11. The rotation angle sensing device according to claim 10, wherein an angle between a first segment along the first projected arrow and a second segment along the second projected arrow is $(180/(N+1))°$ or $180 \times N/(N+1))°$ (N is an integer greater than or equal to 1).

12. The rotation angle sensing device according to claim 1, wherein the magnetic sensor part includes a TMR element, a GMR element or an AMR element.

13. The rotation angle sensing device according to claim 1, wherein
the magnetic sensor part is a first one of a plurality of magnetic sensor parts, and
at least the first one and a second one of the magnetic sensor parts are arranged substantially at intervals of $(180/M)°$ (M is an integer greater than or equal to 2) centering on the rotary shaft along the circumferential direction on a plane that is orthogonal to the rotary shaft.

14. The rotation angle sensing device according to claim 13, wherein each of the magnetic sensor parts outputs the magnetic field intensity $H_r$ in the radial direction or the magnetic field intensity $H_\theta$ in the circumferential direction as the sensor signal.

* * * * *